(12) United States Patent
Atsushi

(10) Patent No.: US 7,635,200 B2
(45) Date of Patent: Dec. 22, 2009

(54) PLANAR LIGHT SOURCE DEVICE AND DISPLAY USING THE SAME

(75) Inventor: Sato Atsushi, Kanagawa (JP)

(73) Assignee: Cheil Industries, Inc., Gumi-si, Gyeongsangbuk-do (KR)

(*) Notice: Subject to any disclaimer, the term of this patent is extended or adjusted under 35 U.S.C. 154(b) by 211 days.

(21) Appl. No.: 11/475,102

(22) Filed: Jun. 27, 2006

(65) Prior Publication Data

US 2006/0291185 A1 Dec. 28, 2006

(30) Foreign Application Priority Data

Jun. 28, 2005 (JP) ............................. 2005-188842

(51) Int. Cl.
*F21V 5/00* (2006.01)
*F21V 17/02* (2006.01)
(52) U.S. Cl. ....................................... 362/244; 362/330
(58) Field of Classification Search ................. 362/244, 362/330, 329, 620, 619, 606, 607, 223–225
See application file for complete search history.

(56) References Cited

U.S. PATENT DOCUMENTS

| | | | | |
|---|---|---|---|---|
| 5,579,134 A | * | 11/1996 | Lengyel | 362/330 |
| 7,220,038 B2 | * | 5/2007 | Yamashita et al. | 362/606 |
| 2005/0099815 A1 | * | 5/2005 | Kim et al. | 362/339 |

FOREIGN PATENT DOCUMENTS

| JP | 05-038216 | 2/1993 |
|---|---|---|
| JP | 6-250178 | 9/1994 |

* cited by examiner

*Primary Examiner*—Bao Q Truong
(74) *Attorney, Agent, or Firm*—Lee & Morse, P.C.

(57) ABSTRACT

A planar light source device having excellent in-plane uniformity of brightness includes an illuminator having an array of light sources, a light transmission plate in an optical path of light output by the illuminator, and a plurality of refractive diffusing elements on the light transmission plate, each refractive diffusing element providing more than two refractive surfaces in at least one vertical cross-section along the optical path at an angle determined in accordance with a pattern of the array of light sources. Each refractive diffusing element may be a polygonal prism or a microlens.

24 Claims, 21 Drawing Sheets

500

730

730

Hue histogram distribution

Hue histogram distribution

☐ Region A
■ Region B

Region A          Region B

PLANAR LIGHT SOURCE DEVICE AND DISPLAY USING THE SAME

BACKGROUND OF THE INVENTION

1. Field of the Invention

The present invention relates to a planar light source device. More particularly, the present invention relates to a planar light source device providing uniform brightness and a display using the same.

2. Description of the Related Art

Conventionally, backlight units for liquid crystal displays (LCDs) have been planar light sources. Such planar light sources include an edge light type using an edge emitter with a light guide plate (LGP) and a direct light type using an array of light sources.

In the edge light type source, white dots or lines may be formed on a rear surface of the light guide plate in order to direct light to a light crystal panel (LCP) by guiding the light along the LGP using internal reflection. In order to output illumination having in-plane uniform brightness, the edge light type source also needs a diffusion sheet to blur a pattern formed by specular reflection off the rear surface.

Direct light type sources may also include a diffusion plate and a diffusion sheet disposed on an upper surface of the light source device in order to obtain in-plane uniform brightness by blurring a pattern of the array of light sources. Direct light type sources may include cold cathode fluorescent lamps (CCFLs) outputting white light and light emitting diodes (LEDs) emitting multiple wavelengths, e.g., red, green and blue, which combine to form white light.

The diffusion plate and/or the diffusion sheet used for the conventional planar light source devices has a strong light diffusion function in order to conceal an underlying pattern and to prevent regions of nonuniform brightness called mura. The conventional planar light source devices have a problem in that light is diffused in directions other than the direction of the LCP, thereby lowering the brightness of the LCD.

One proposed solution includes passing light emitted from a rod-shaped light source through a triangular prism having angled faces in a longitudinal direction of the rod-shaped light source. The triangular prism produces virtual images in addition to the real image, thus producing illumination having in-plane uniform brightness without reducing brightness of the light source. However, the triangular prism has a simple cross-section with two angled faces serving as refractive surfaces. Since only two virtual images are formed for each input light, the triangular prism still cannot provide a desired brightness or prevent generation of mura.

SUMMARY OF THE INVENTION

The present invention is therefore directed to a planar light source device and a display using the same, which substantially overcome one or more of the problems due to the limitations and disadvantages of the related art It is therefore a feature of an embodiment of the present invention to provide a planar light source device having a concealing sheet to effectively blur a pattern of the light source while maintaining as much brightness as possible, and a display using the same.

It is therefore another feature of an embodiment of the present invention to provide a planar light source device emitting light with uniform brightness without generating mura, and a display using the same.

At least one of the above and other features and advantages of the present invention may be realized by providing a planar light source device, including an illuminator including an array of light sources, a light transmission plate in an optical path of light output by the illuminator, and a plurality of refractive diffusing elements on the light transmission plate, each refractive diffusing element providing more than two refractive surfaces in at least one vertical cross-section along the optical path at an angle determined in accordance with a pattern of the array of light sources.

Each refractive diffusing element may be a polygonal prism having a polygon shape in a horizontal cross-section orthogonal to the optical path. Surfaces of each polygonal prism in both vertical cross-sections may have angles adjusted such that virtual images formed by the refractive surfaces continuously overlap each other. In the polygon shape in the horizontal cross-section, a maximum distance between line segments of the polygon may be less than or equal to a resolution limit of a naked eye.

The light sources may be rod-shaped light sources arranged parallel to the X direction. Each polygonal prism may have a rectangular shape in the horizontal cross-section, and a longitudinal direction of each rod-shaped light source may correspond to a longitudinal direction of each polygonal prism. When a distance between adjacent rod-shaped light sources in the X direction is "a", a diameter of each rod-shaped light source is "b", and a number of refractive surfaces of each polygonal prism in the vertical cross-section in the X direction is "m", m may be greater than or equal to a/b and greater than two.

The light sources may be full color light emitting diode (LED) units arranged in the X and Y directions to form an LED array. The more than two refractive surfaces of each polygonal prism in a vertical cross-section in the Y direction may have angles adjusted such that virtual images of LED units continuously overlap. The more than two refractive surfaces of each polygonal prism in the vertical cross-section in the X direction have angles adjusted such that virtual images of LED units continuously overlap.

The light sources may be a reflection pattern on a surface of a light guide plate and the refractive surfaces of each polygonal prism may have angles set corresponding to the reflection pattern.

Each refractive diffusing element may be a micro-lens. Each micro-lens may have a size less than or equal to a resolution limit of a naked eye. The light sources may be rod-shaped light sources arranged in parallel. The light sources are full color light emitting diode (LED) units arranged in parallel in the X and Y direction to form a LED array, each of the micro-lenses may be an anamorphic lens having different radii of curvature in the X and Y directions, respectively, and the radii of curvature may be adjusted such that virtual images of the LED light sources continuously overlap in the Y direction and virtual images of the LED light sources continuously overlap in the X direction.

The light sources may be a reflection pattern on a surface of a light guide plate, and each micro-lens has a shape set corresponding to the reflection pattern.

The micro-lens array may be a micro-cylindrical lens array. The micro-cylindrical lens array may include a plurality of cells corresponding to the pattern of the light source, a first cell having a plurality of the micro-cylindrical lenses arranged in a first direction, and at least one cell surrounding the first cell having a plurality of the micro-cylindrical lenses arranged in a second direction.

Sizes of the micro-lenses vary within the array. Arrangement of the micro-lenses may be uniform or arbitrary.

The planar light source device may include at least one of surface relief type or volume phase type grating in the optical path of the illuminator.

At least one of the above and other features and advantages of the present invention may be separately realized by providing a substrate for a planar light source device, the substrate including a plurality of polygonal prisms forming a polygonal prism array formed on at least one surface thereof, each polygonal prism having a quadrilateral shape in a horizontal cross-section.

At least one of the above and other features and advantages of the present invention may be separately realized by a display, including a display panel, and a planar light source device illuminating the display panel, the planar light source device having an illuminator including an array of light sources, a light transmission plate in an optical path of light output by the illuminator, and a plurality of refractive diffusing elements on the light transmission plate, each refractive diffusing element providing more than two refractive surfaces in at least one vertical cross-section along the optical path at an angle determined in accordance with a pattern of the array of light sources.

At least one of the above and other features and advantages of the present invention may be separately realized by a display, including a display panel, and a planar light source device illuminating the display panel, the planar light source device having a substrate including a plurality of polygonal prisms forming a polygonal prism array formed on at least one surface thereof, each polygonal prism having a quadrilateral shape in a horizontal cross-section.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE INVENTION

Figure 1:
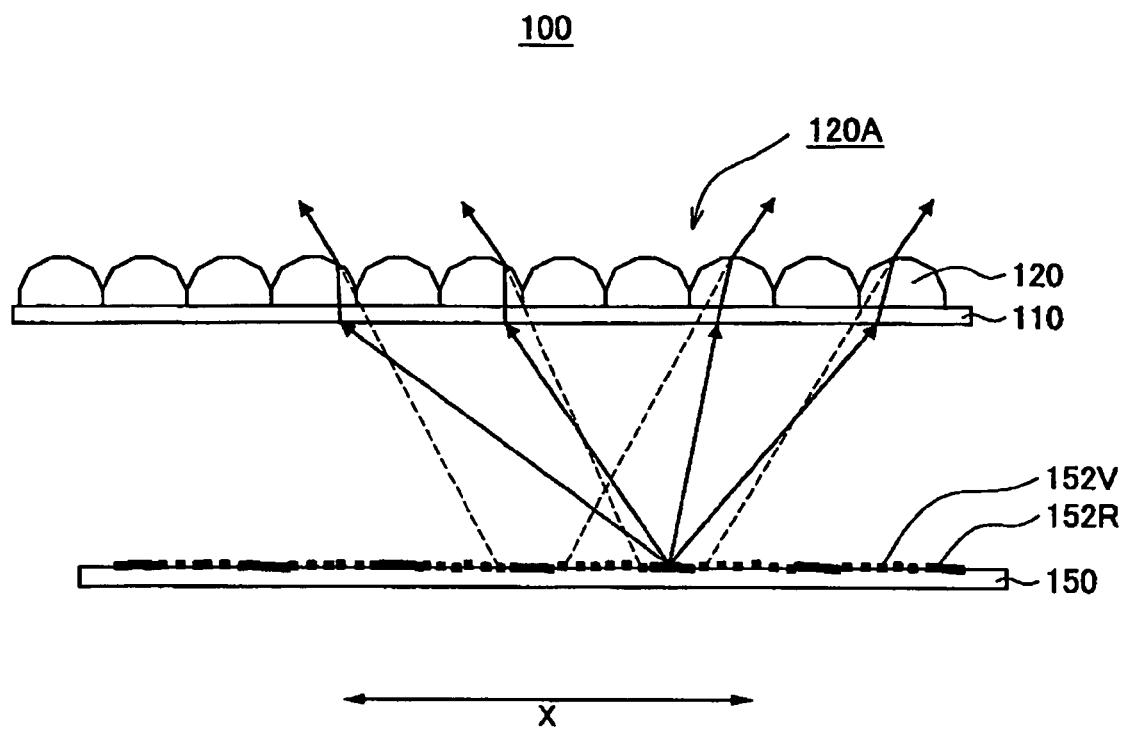
FIG. 1 illustrates a cross-sectional view of a concealing sheet in accordance with a first embodiment of the present invention.

Japanese Patent Application No. 2005-188842, filed on Jun. 28, 2005, in the Japanese Intellectual Property Office, and entitled: "Planar Light Source Device and Liquid Crystal Display Using the Same," is incorporated by reference herein in its entirety.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the figures, the dimensions of layers and regions are exaggerated for clarity of illustration. It will also be understood that when a layer is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

As discussed in detail below, embodiments of the present invention may be directed to providing a concealing sheet for blurring a pattern of an array of line or point sources while maintaining brightness of the sources, and may be used to form a planar light source for backlighting a non-emitting display, e.g., a liquid crystal display (LCD).

First, a polygonal prism type rear side image concealing sheet in accordance with embodiments of the present invention is set forth. A planar light source device using the same will be described hereinafter.

In FIG. 1, a concealing sheet 100 according to a first embodiment for use in the planar light source device may include a light transmission plate 110 and a polygonal prism array 120A on the light transmission plate 110. The polygonal prism array 120A may include a plurality of polygonal prisms 120. In FIG. 1, a medium 150 serves as a viewing plane, with the concealing sheet 100 being positioned at a rear of the medium 150 which is to be viewed from a front thereof. In the planar light source device, light sources will be provided on the opposite side of the concealing sheet 100 from the medium 150. At the medium 150, the concealing sheet 100 may output a real image 152R and a virtual image 152V that overlaps the real image 152R, blurring the real image 152R.

The light transmission plate 110 and the polygonal prisms 200 may be composed of a transparent resin, e.g., polymethylmethacrylate (PMMA), polycarbonate (PC), cyclo-olefin polymer (COP), cyclic olefin copolymer (COC) and the like. In addition, the light transmission plate 110 and the polygonal prisms 200 may be formed into a predetermined shape in a transparent resin (formed by adding additives to poly(ethylene terephthalate) (PET), polyethylenenaphthalate (PEN), PMMA, PC, COP, COC, and the like) on inner and outer surfaces on the light transmission plate composed of PET, PEN, acryl, PC, COP, COC, and the like.

Although not shown, in order to obtain uniform illumination, the sheet 100 may further include light-scattering particles distributed in the light transmission plate 110. In addition, although not shown, at least one layer of a surface relief type and/or volume phase type grating may be added on the rear side of the light transmission plate 110. With this structure, diffracted images of the light sources may be generated in specific plural directions according to pitches of the grating, thereby providing a planar light source having a more uniform brightness while further enhancing effect of concealing the pattern of the light sources.

Figure 2A:
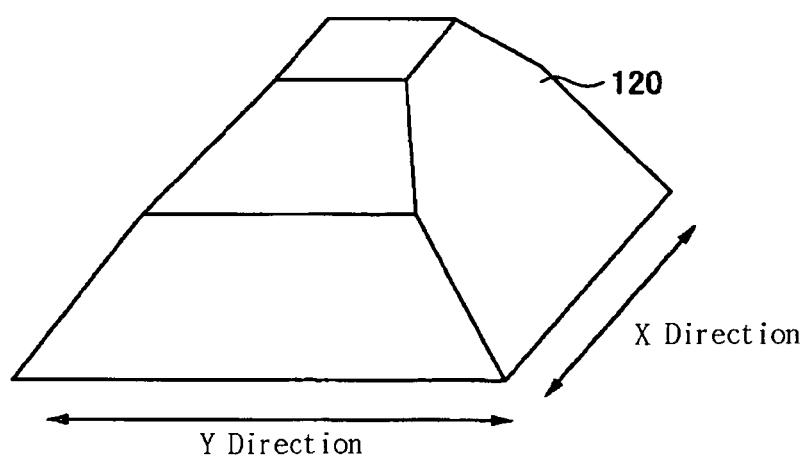
FIGS. 2a and 2b respectively illustrate a perspective view and a plan view of a polygonal prism used in the concealing sheet in accordance with the first embodiment of the present invention.
Figure 2B:
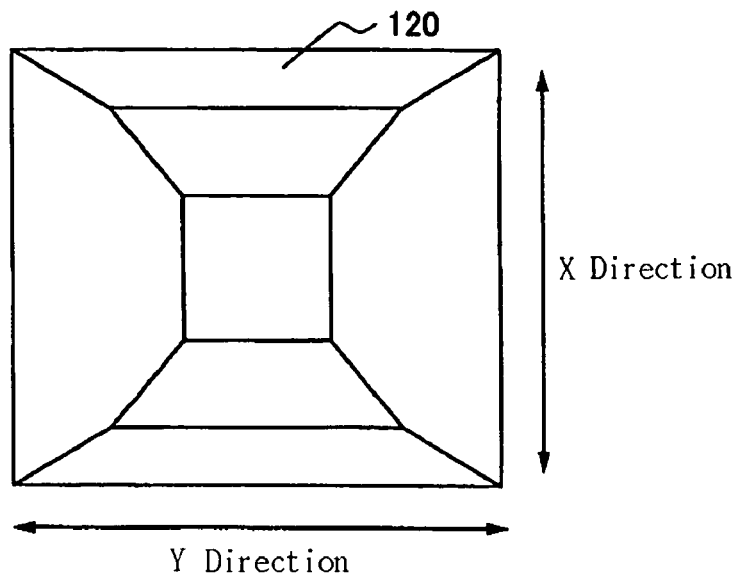

As shown in FIGS. 2a and 2b, each of the polygonal prisms may be a three-dimensional prism. As shown in FIG. 2b, the polygonal prisms according to the first embodiment may have a quadrilateral shape in a horizontal cross-section (taken along XY axes in the drawing), and may be arranged corresponding to light sources as a concealing object. However, the present invention is not limited to this structure, and the horizontal cross-section may be, e.g., a rectangular shape, a square shape, and a parallelogram shape. For example, although the polygonal prism shown in FIG. 2b has a substantially square shape in the cross-section taken along the XY axes, the polygonal prism may have a rectangular shape in the cross-section taken along the XY axes, e.g., a horizontal length, i.e., a length in a Y direction, of the prism may be longer than a vertical length, i.e., a length in an X direction, thereof.

As described below, refractive surfaces formed in the vertical cross-section of each polygonal prism may have angles determined such that virtual images formed thereby overlap each other at an equal interval without a gap between adjacent image patterns. In the example shown in FIGS. 2a and 2b, the horizontal cross-section of each polygonal prism has five refractive surfaces including a top surface in the X direction, and three refractive surfaces including the top surface in the Y direction, so that each polygonal prism has a plurality of refractive surfaces in three dimensions. The number of refractive surfaces is not limited to the example shown in FIGS. 2a and 2b. If three or more refractive surfaces are desired in the X and Y directions, the design of the polygonal prisms may be changed accordingly.

When each polygonal prism 120 has the quadrilateral shape in the horizontal cross-section, plural polygonal prisms may be tightly arranged without forming a gap between adjacent polygonal prisms, thereby forming the polygonal prism array 120a. A side of each polygonal prism 120 in an arranging direction of the plural polygonal prisms along the pattern below the rear side of the substrate, i.e., the X direction of FIG. 1, may, for example, be about 20~300 μm, which is less than or equal to a resolution limit of the naked eye.

The term "resolution limit of the naked eye" can be defined as follows. When L is a distance from a viewer to the concealing sheet 100 or a display using the concealing sheet 100, the resolution limit of the naked eye is the minimum distance by which the viewer can distinguish an object unaided. This resolution limit may be expressed by the equation: L tan θ, where θ is the minimum angle of resolution by the naked eye and is equal to 1 minute (1/60 degrees). For example, when L=30 cm, e.g., when viewing a personal computer, the resolution limit of the naked eye is 72 μm, and, when L=1 m, e.g., when viewing a large display, the resolution limit of the naked eye is 290 μm.

As noted above in the Background, when the prism has a simple structure, e.g., a triangular vertical cross-section, two angled faces serve as the refractive surfaces. However, these two refractive surfaces may not realize a required uniform brightness.

However, if each prism provides three or more refractive surfaces in the vertical cross-sections thereof in an arrayed direction of light source pattern to be concealed, a plurality of virtual images can be more effectively formed, further blurring the array patterns and providing more uniform brightness. Further, when three or more refractive surfaces are provided in the concealing sheet, e.g., using a polygonal prism, used with a display as described below, mura is reduced or substantially eliminated as compared to the triangular prism structure.

Although the polygonal prism of the first embodiment has three refractive surfaces in the cross-section taken along the Y-axis, the present invention is not limited to this structure. As the number of refractive surfaces formed on the surface of the polygonal prism 120 is increased, the number of virtual images is also increased, thereby improving in-plane uniform brightness. In order to further enhance the reduction in mura as compared with the triangular prism structure, the number of refractive surfaces of each polygonal prism 120 may be three or more at one or both of the vertical cross-sections thereof, i.e., along the optical path or Z axis, preferably five or more, and more preferably ten or more.

Additionally, as described below, if the object to be concealed is an array of light sources for the planar light source device used for an image display device, the number of refractive surfaces of the concealing sheet can be suitably determined according to types of light sources to be employed, e.g., rod-shaped light sources, LED light sources, a light guide plate light source, and the like, and dimensions and uses of the patterned light source.

Figure 3:
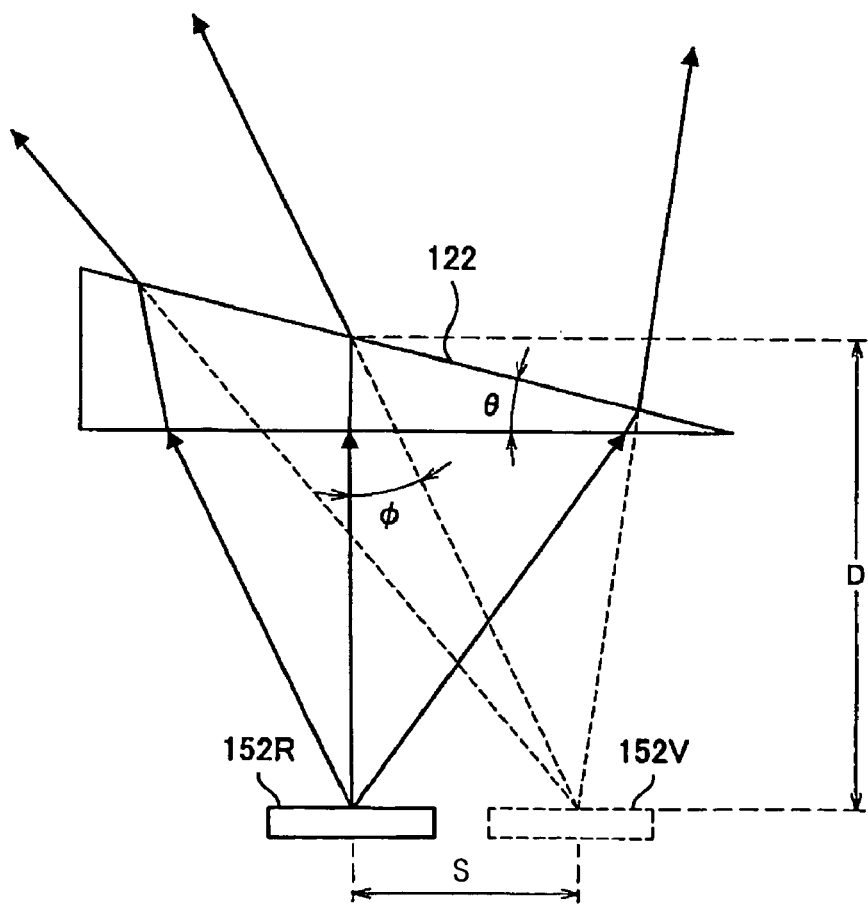
FIG. 3 illustrates an explanatory drawing showing a principle of concealing a rear side image by the polygonal prism in accordance with the first embodiment of the present invention.
Figure 4:
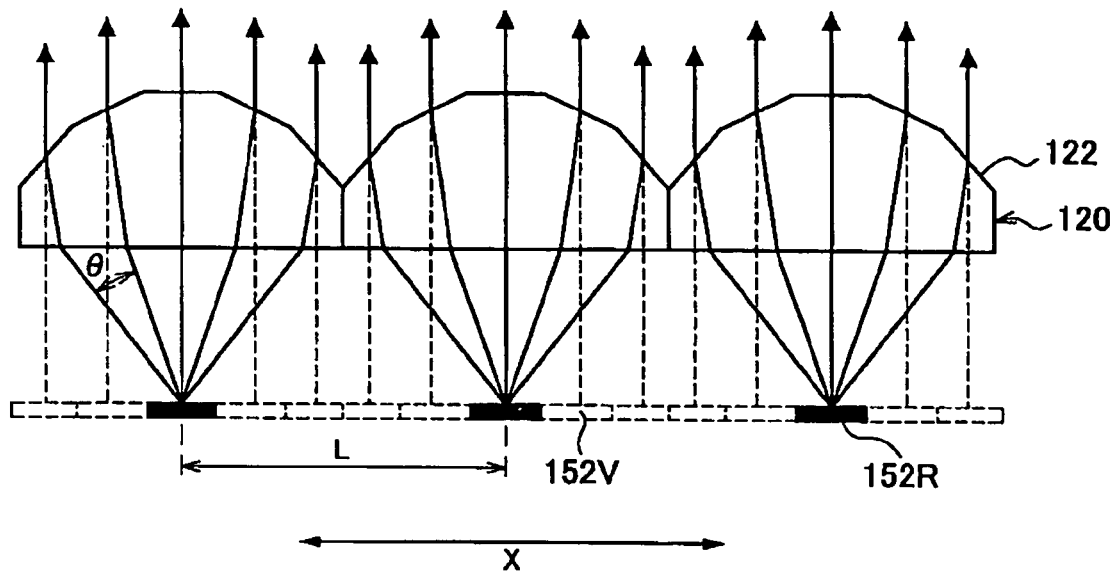
FIG. 4 illustrates an explanatory drawing showing a principle of concealing the rear side image by the polygonal prism in accordance with the first embodiment of the present invention.

In FIGS. 3 and 4, a principle of concealing a rear side image by the concealing sheet 100 is illustrated. As shown in FIG. 3, when the prism has an angled face 122 having an angle θ with respect to the real image 152R, the virtual image 152V is offset from the real image 152R by a distance S in the plane separated from the prism by a distance D. This offset distance S can be obtained by the following Equation 1:

$$S = D \cdot \tan \phi \quad (1)$$

where $\phi = \sin^{-1}(n \cdot \sin \theta) - \theta$ and n is a refractive index of the prism material.

Accordingly, as shown in FIG. 4, polygonal prisms having refractive surfaces with angles θ which are determined to allow a plurality of virtual images 152V to be linearly arranged at equal intervals without gaps when adjacent real images 152R are separated by a distance L.

Next, referring to FIGS. 5 and 6, a planar light source device 200 using the concealing sheet 100 in accordance with the first embodiment will be described.

Figure 5:
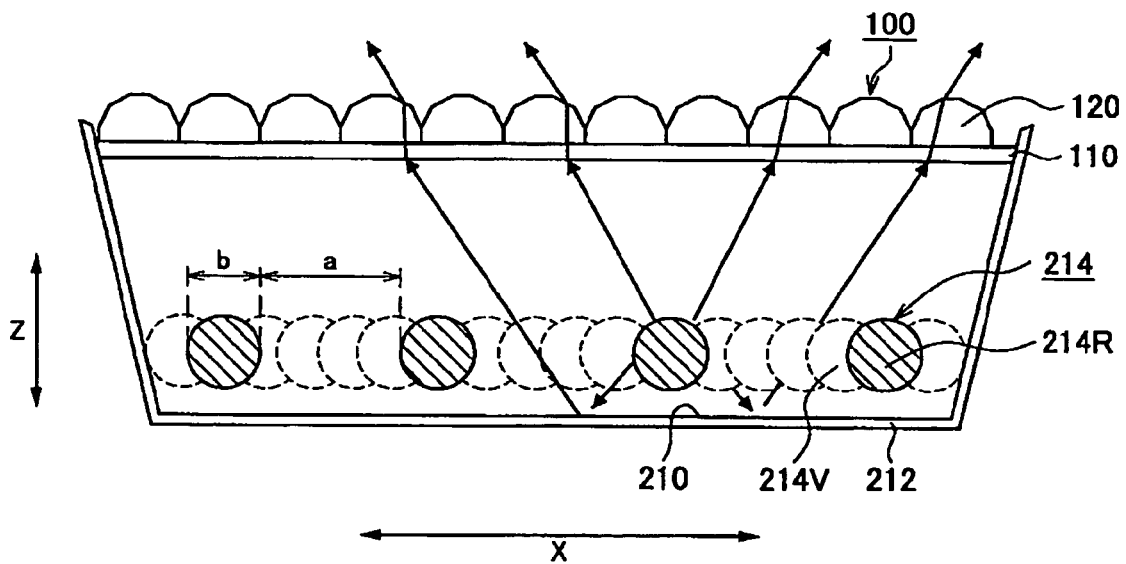
FIG. 5 illustrates a cross-sectional view of a planar light source device including the concealing sheet of the first embodiment and a rod-shaped light source.
Figure 6:
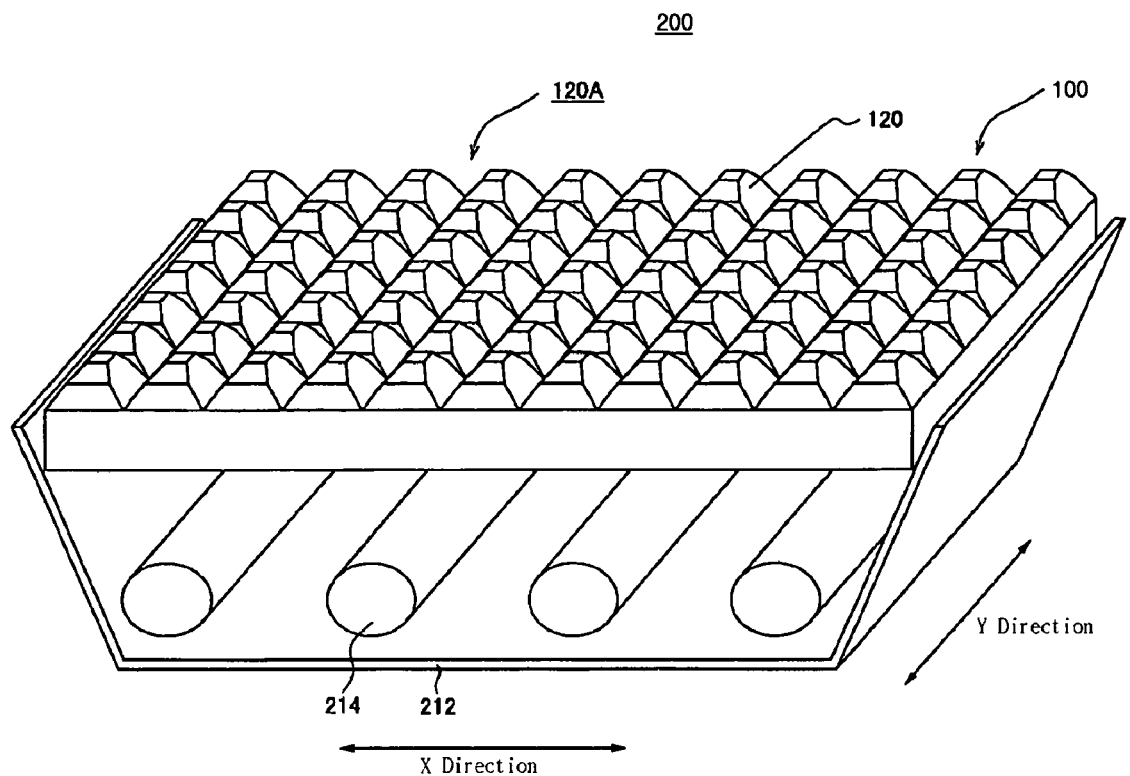
FIG. 6 illustrates a perspective view of the planar light source device including the concealing sheet of the first embodiment of the present invention and a rod-shaped light source.

As shown in FIGS. 5 and 6, the planar light source device 200 may include a lighting body 212 having a mirror reflection plane or a diffusion reflection plane 210 on an inner bottom surface thereof and an opening at an upper portion thereof. The lighting body 212 may house a plurality of rod-shaped light sources 214, e.g., CCFLs, which may be arranged in parallel at a lower portion thereof to form a rod-shaped light source array. Although four rod-shaped light source rows are shown in the example of FIG. 5, this structure is adopted for convenience of description. Thus, it should be noted that the dimensions, the number of the rod-shaped light sources 214 and the distance between adjacent rod-shaped light sources 214 may be suitably selected according to the size or the brightness of the planar light source device required.

The opening of the lighting body 212 may be covered with the rear side image concealing sheet 100 as described in FIGS. 1 and 2. The number of refractive surfaces of each polygonal prism 120 in the rear side image concealing sheet 100 in the arranging direction of the rod-shaped light sources 214, i.e., the X direction, may be selected such that virtual images 214V may be formed without a gap between real images 214R.

The virtual images 214V formed by the polygonal prisms 120 may be arranged at locations offset by a value obtained by multiplying the number of faces of the polygonal prism 120 and the number of rod-shaped light sources 214. Thus, when a distance between adjacent rod-shaped light sources 214 is "a", a diameter of each rod-shaped light source 214 is "b", and the number of refractive surfaces of each polygonal prism 120 is "m", the number "m" of refractive surfaces in each polygonal prism 120 can be selected such that m≧a/b (here, m≧3).

For example, if the rod-shaped light sources 214 each have a diameter of 2 mm and are arranged with a distance of 20 mm therebetween, each polygonal prism may have at least ten refractive surfaces in a cross-section taken along XZ axes to insure that the real and virtual images output by the rod-shaped light sources 214 through the sheet 100 are linearly arranged without a gap therebetween, thus providing uniform brightness. In other words, the output of the planar light source device 200 may appear as a continuous output. In addition, increases in the number of refractive surfaces increases overlap between the virtual images 214V themselves, as well as with the real images 214R, thereby enhancing in-plane uniform brightness.

Figure 7:
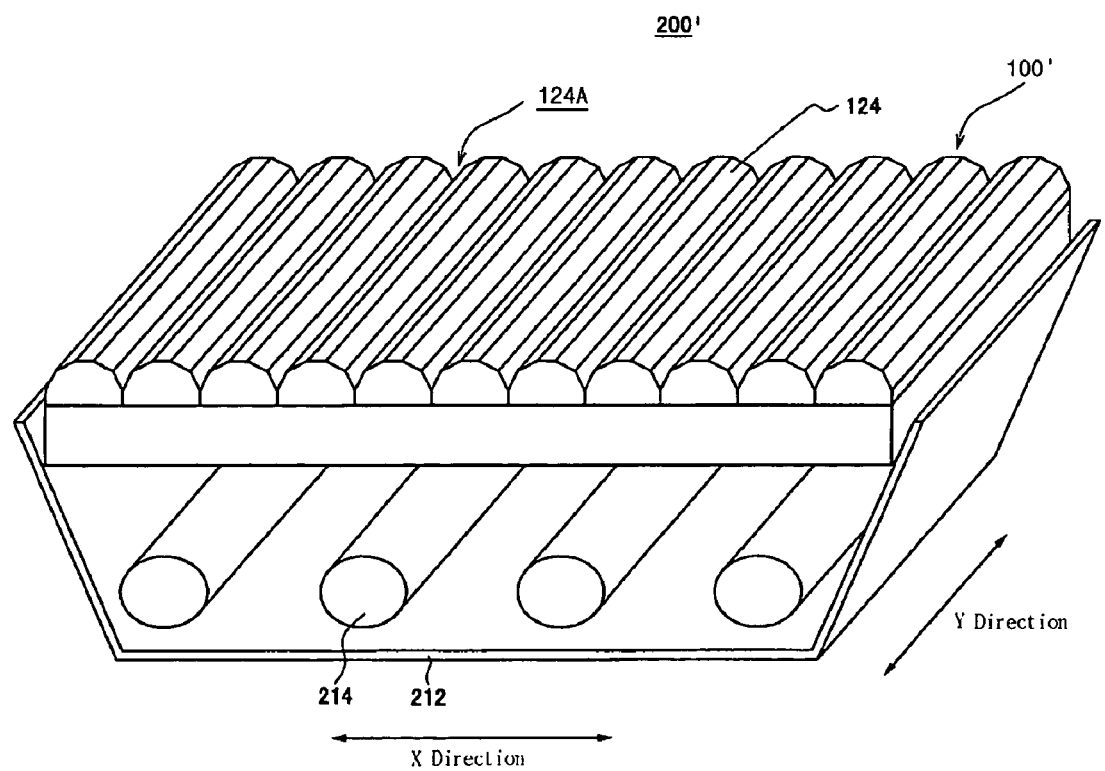
FIG. 7 illustrates a perspective view of the planar light source device including a concealing sheet in accordance with a second embodiment of the present invention and a rod-shaped light source.

When the rod-shaped light source array is made of plural rod-shaped light sources 214 that are continuous along the Y-direction the polygonal prism may also be continuous along the Y-direction, i.e., may have a rectangular shape in a horizontal cross-section taken along XY axes. In FIG. 7, a planar light source device 200' may include rod-shaped light sources 214 and a concealing sheet 100' in accordance with a second embodiment of the present invention. The concealing sheet 100' may include polygonal prisms 124, each having a rectangular shape in the horizontal cross-section taken along the XY axes, forming a one-dimensional array 124A. As shown in FIG. 7, the polygonal prisms 124 and rod-shaped light sources 214 may be arranged such that a longitudinal direction, i.e., the Y direction, of each rod-shaped light source corresponds to a longitudinal direction of each polygonal prism. In terms of the length of the polygonal prism 124', each of the polygonal prisms may have substantially the same length as that of the rod-shaped light source. Alternatively, a plurality of polygonal prisms may be arranged in the longitudinal direction so as to correspond to the length of each rod-shaped light source.

With either structure as described above, the output of the planar light source device 200 or 200' appears as though it is from a single source, thereby concealing the array structure of the rod-shaped light sources while providing uniform brightness. In addition, when the plural polygonal prisms are arranged in the longitudinal direction, i.e., the Y direction, a viewing angle (wide angle) can be narrowed in a longitudinal direction of the rod-shaped light source, thereby enhancing brightness.

Figure 8:
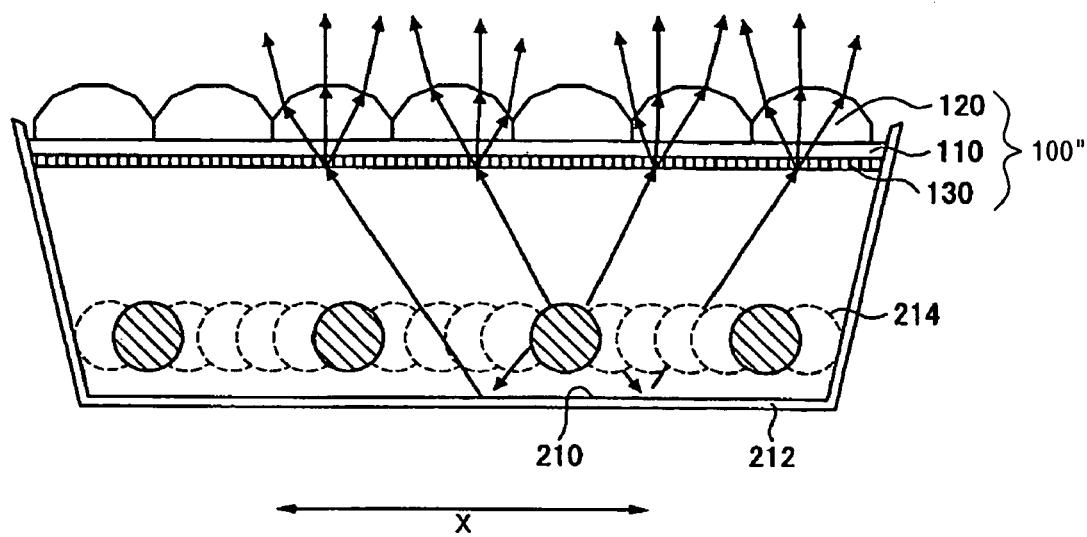
FIG. 8 illustrates a cross-sectional view of the planar light source device including a concealing sheet in accordance with a third embodiment of the present invention and a rod-shaped light source.

As shown in FIG. 8, a planar light source device 220 may include rod-shaped light sources 214 and a concealing sheet 100" in accordance with a third embodiment of the present invention. The concealing sheet 100" may include the polygonal prisms 120, the light transmission plate 110 and at least one layer of a surface relief type and/or volume phase type grating 130 on the rear side of the light transmission plate 110. With this structure, diffracted images of light sources may be generated in specific multiple directions according to pitches of the grating, thereby further concealing the pattern of the light sources.

Figure 9:
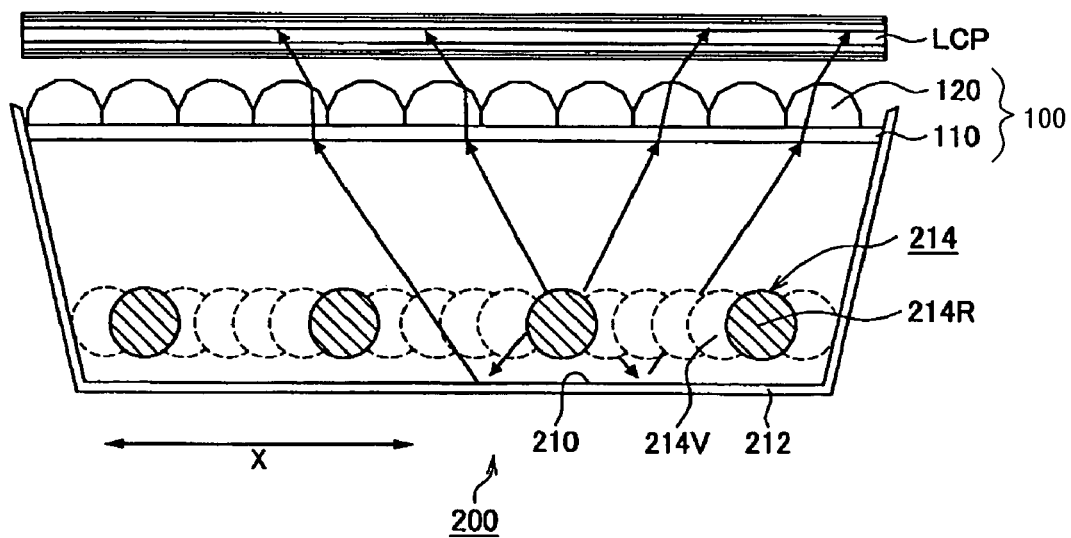
FIG. 9 illustrates a cross-sectional view of a liquid crystal display including the planar light source device having the concealing sheet in accordance with the first embodiment of the present invention and a rod-shaped light source.

In FIG. 9, a LCD 310 may include the planar light source device 200 and a liquid crystal panel (LCP). An LCP driving device (not shown) forms an image on the LCP. In the LCD 310, a rear side of the LCP is illuminated with light having high in-plane uniform brightness without mura, and the illuminated image is emitted from a surface of the LCP. Since the LCP and the LCP driving device are not directly related to the present invention, detailed description thereof will be omitted.

Figure 10:
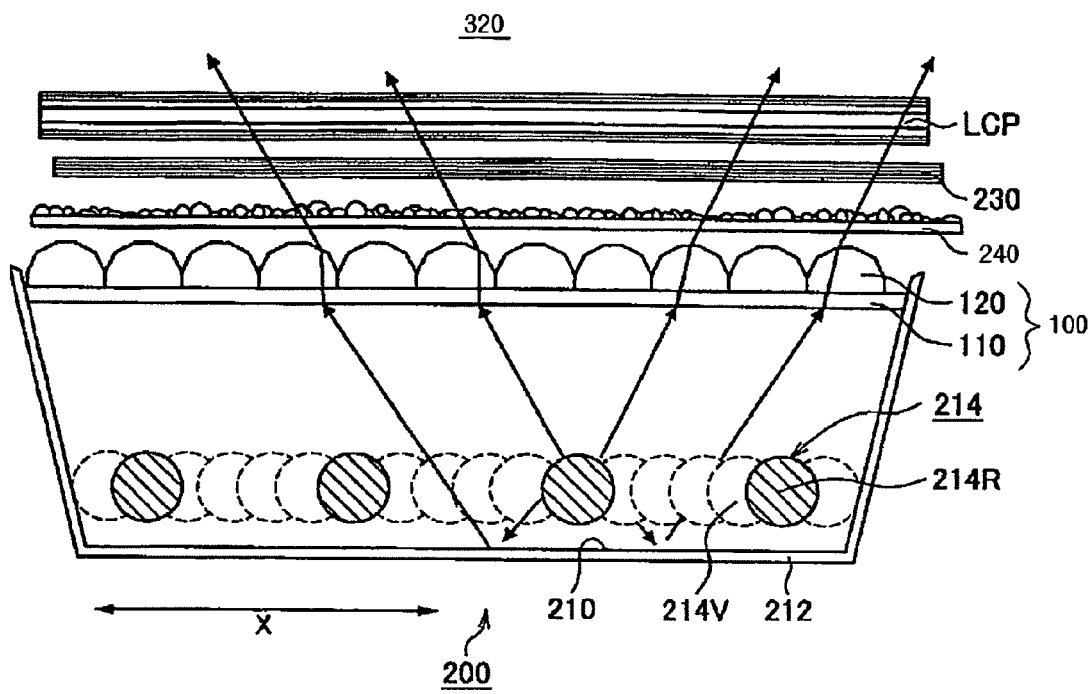
FIG. 10 illustrates a cross-sectional schematic view of a liquid crystal display including the planar light source device having the concealing sheet in accordance with the first or second embodiments of the present invention, a rod-shaped light source and an additional diffuser.

In FIG. 10, a LCD 320 may include the planar light source device 200, the LCP, a diffusion sheet 240 having a rough surface to diffuse transmitted light and a brightness increasing film 230, e.g., a reflection type polarizing plate. The diffusion sheet 240 and the brightness increasing film 230 may be disposed between the planar light source device 200 and the LCP. The diffusion sheet 240 may further increase brightness uniformity and the brightness increasing film 230 may increase brightness of the light from the planar light source device 200 used to illuminate the rear side of the LCP. Although both diffusion sheet 240 and brightness increasing film 230 are provided in the embodiment of FIG. 10, the diffusion sheet 220 and/or the brightness increasing film 230 may be used by itself with the planar light source device 200, if necessary. Further, these additional elements may be provided anywhere between the light source 214 and the LCP, and may be provided in any order.

Figure 11:
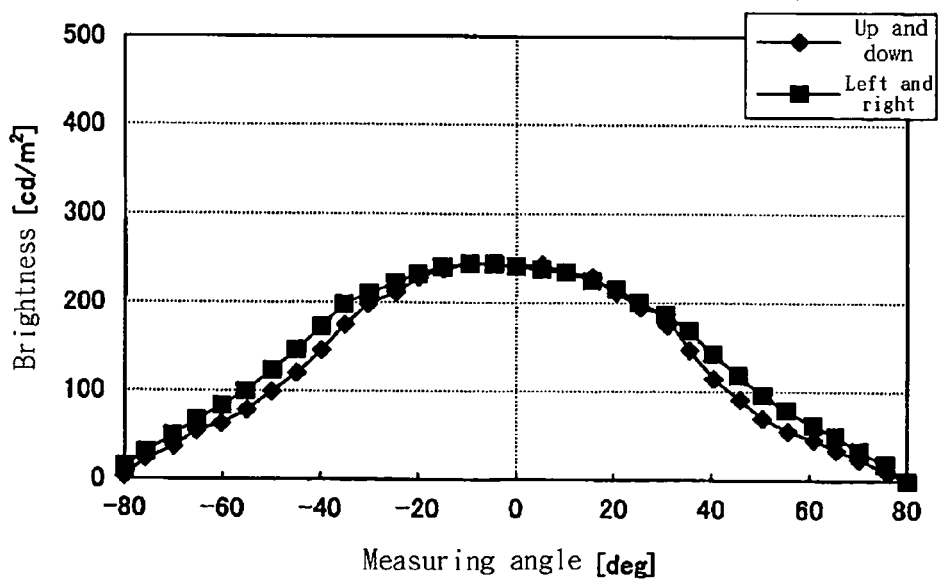
FIG. 11 illustrates a plot of brightness versus measuring angle of a related art planar light source device.
Figure 12:
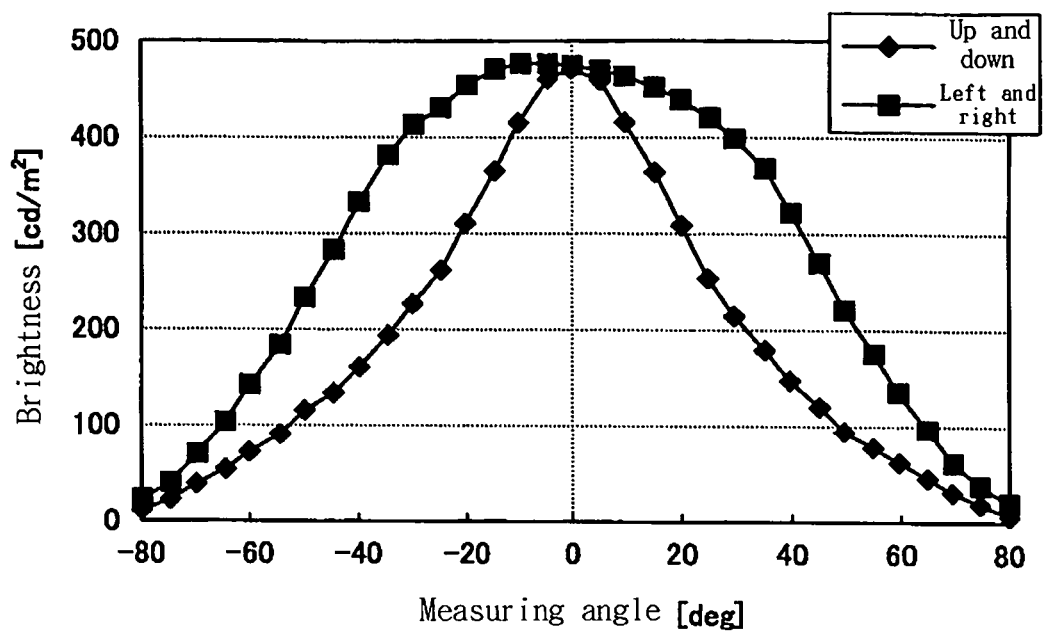
FIG. 12 illustrates a plot of brightness versus measuring angle of a planar light source device in accordance with the first embodiment of the present invention.

FIG. 11 illustrates a plot of brightness versus measuring angle of a related art planar light source device, and FIG. 12 illustrates a plot of brightness versus measuring angle of the planar light source device 200 using the concealing sheet 100 in accordance with the first embodiment. As can be seen by comparing FIGS. 11 and 12, at a measuring angle of 0°, the related art planar light source device emits light having a brightness of about 250 cd/m$^2$, while the planar light source device 200 emits light having a brightness of about 500 cd/m$^2$. Thus, a planar light source device including the concealing sheet 100 according to the first embodiment may output light having improved in-plane uniform brightness without generating mura.

Figure 13:
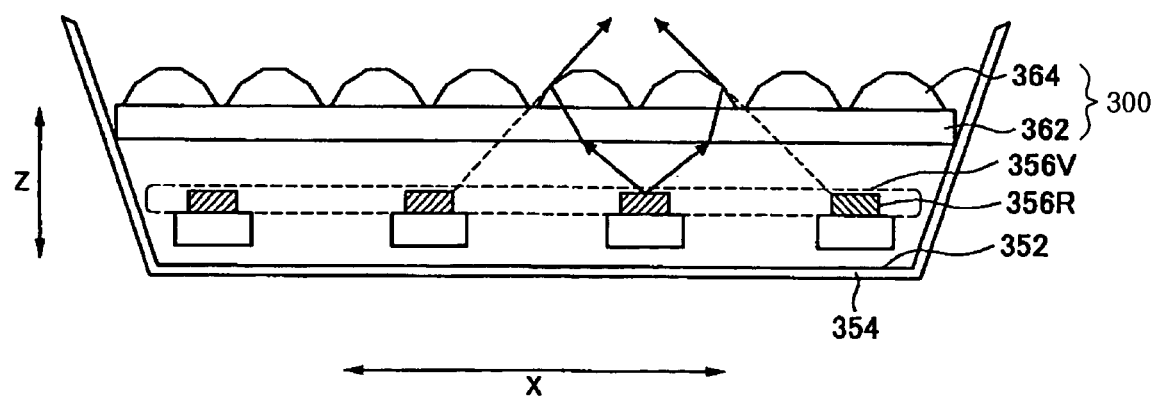
FIG. 13 illustrates a cross-sectional view taken along XZ axes of the planar light source device having a concealing sheet in accordance with a fourth embodiment of the present invention and LED light sources.

Next, referring to FIGS. 13 to 16, an embodiment of a planar light source device 350 including a concealing sheet 300 in accordance with a fourth embodiment of the present invention and LED light sources will be described. FIG. 13 illustrates a cross-sectional view taken along XZ axes of the planar light source device 350, FIG. 14 illustrates a cross-sectional view taken along YZ axes of the planar light source device 350, FIG. 15 illustrates an XY-plan view of an arrangement of the LED light sources of the planar light source device 350, and FIG. 16 illustrates a perspective view of an arrangement of polygonal prisms and LED light sources of the planar light source device 350.

Figure 14:
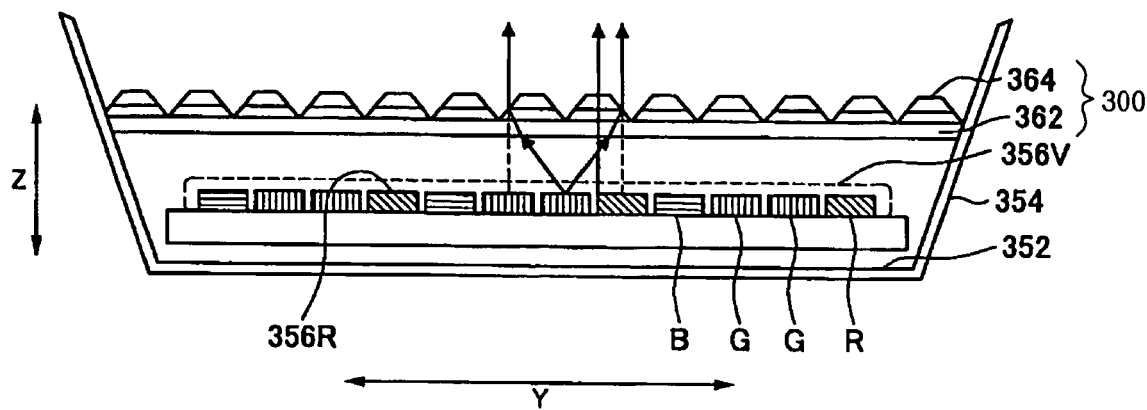
FIG. 14 illustrates a cross-sectional view taken along YZ axes of the planar light source of FIG. 13.

As shown in FIGS. 13 and 14, the planar light source device 350 may include a lighting body 354 having a mirror reflection plane or a scattering reflection plane 352 formed on an inner, lower surface, and an opening formed at an upper portion thereof. The lighting body 354 may house a plurality of LED light sources 356R for emitting RGB colors arranged at a lower portion thereof.

Figure 15:
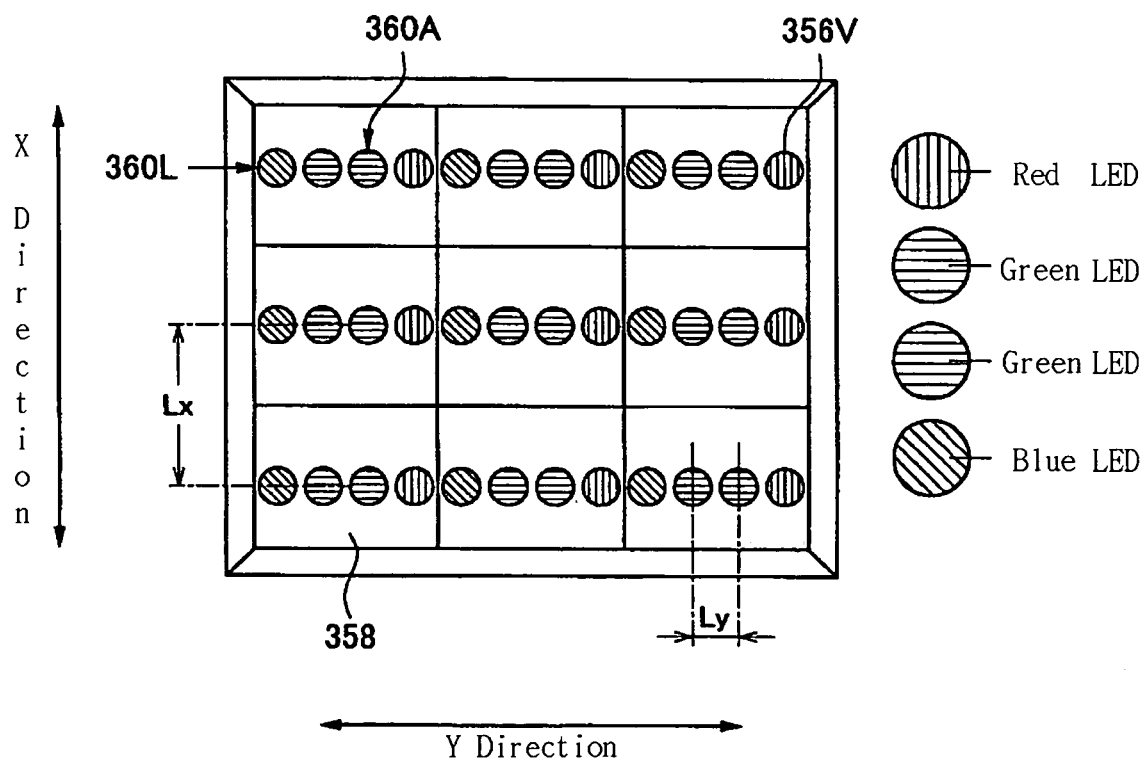
FIG. 15 illustrates a plan view of a LED light source array of the planar light source device of FIG. 13.
Figure 16:
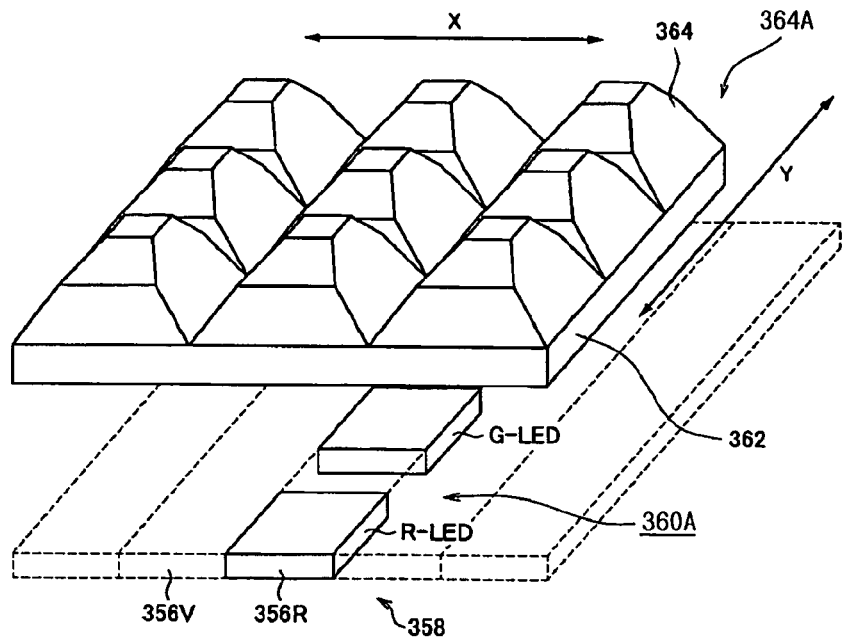
FIG. 16 illustrates a perspective view of the planar light source device of FIG. 13.

As shown in FIG. 15, the LED light sources 356R may be arranged to constitute linear LED light sources 360L, each of which has the LED light sources 356R arranged in a row to constitute RGB units 358 such that each RGB unit 358 includes at least one R, at least one G and at least one B. In the embodiment shown in FIG. 15, each of the RGB units 358 may include one red LED, two green LEDs and one blue LED. Although each of the RGB units 358 may include the LED light sources corresponding to at least one R, at least one G and at least one B, respectively, various structures may be employed according to dimensions or uses of the planar light source device, a particular color combination standard or if a practical white light LED is realized.

A plurality of linear LED light sources 360L may be arranged in parallel, forming an LED light source array 360A. In FIG. 15, the LED light source array 360A may be formed by arranging the linear LED light sources 360L in three rows in which each of the linear LED light sources 360L include four RGB units 358. However, it should be noted that this structure is simplified for convenience of description, and that the number of RGB units 358 and the number of linear LED light sources 360L can be suitably selected according to dimensions or uses of the planar light source device according to the design.

The concealing sheet 300 may include a light transmission plate 362 and polygonal prisms 364 integrally formed on the surface of the light transmission plate 362. The opening of the lighting body 354 may be closed by the light transmission plate 362. The light transmission plate 362 and the polygonal prisms 362 may be made with any of the transparent resins and variations enumerated above regarding the light transmission plate 110 and the polygonal prisms 120.

According to the fourth embodiment, the polygonal prisms 364 may be arranged corresponding to the RGB units 358. As shown in FIGS. 15 and 16, in an arranging direction of the linear LED light sources 360L, i.e., an X direction, polygonal prisms 364, each of which has a diameter less than or equal to the resolution limit of the naked eye, may be continuously arranged in plural rows, three as shown in FIG. 16, thereby forming a polygonal prism array 364A. Similarly, in a direction of the linear LED light sources 360L, i.e., the Y direction, the polygonal prisms 364 may be continuously arranged in plural rows, three rows in FIG. 16. Thus, the polygonal prism array 364A is a three by three array in this example, although clearly is not limited thereto.

Using the polygonal prism array 364A of the fourth embodiment, the output of the LED light source array 360A appears to come from a single source, since virtual images 356V of the linear LED light sources 360L may overlap, concealing the shape of the array of the linear LED light sources 360L while providing uniform brightness distribution. In addition, plural virtual images of the light sources for RGB colors overlap each other, thereby providing uniform white color by mixing RGB colors.

Similar to using the array of rod-shaped light sources, when using the LED light source array 360A, the diffusion sheet and/or the brightness increasing sheet may be employed. Further, the planar light source device 350 of the fourth embodiment can also be used as a backlight for an LCD.

Next, referring to FIG. 17, a light guide plate light source which is coupled to the concealing sheet 100 of the first embodiment will be described hereinafter.

Figure 17:
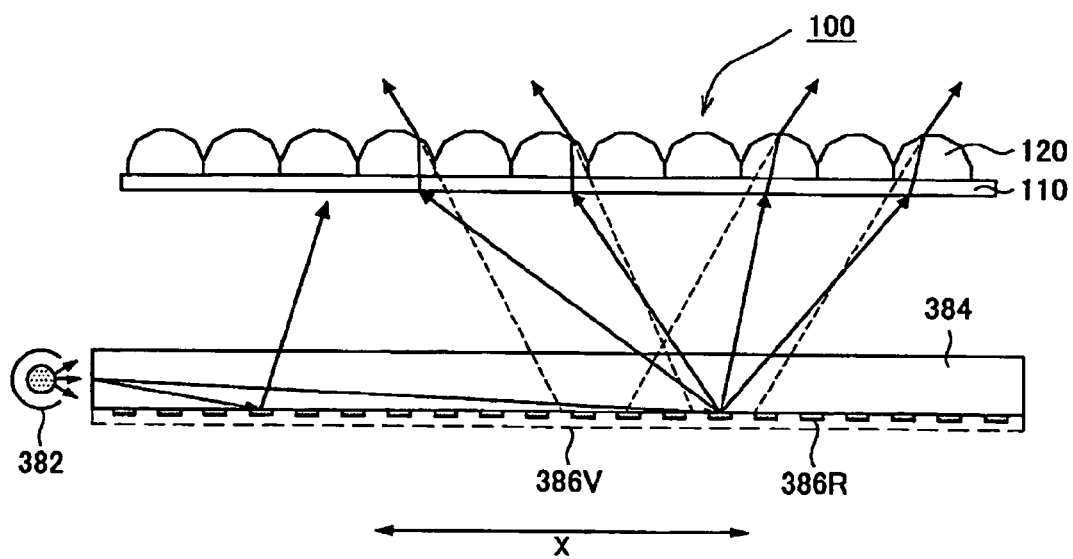
FIG. 17 illustrates a cross-sectional view of a planar light source device having the concealing sheet in accordance with the first embodiment of the present invention, a light guide plate and an edge emitting light source.

As shown in FIG. 17, a planar light source device 380 may include a light guide plate light source having an edge light source 382, e.g., a CCFL, a light guide plate 384 formed of a transparent substrate material to guide light from the edge light source 382, and dots or lines on a rear side of the light guide plate 384 to reflect the light guided in the light guide plate 384 through and out of the light guide plate 384. A planar light source device may be formed by applying the rear side image concealing sheet 100 as shown in FIGS. 1 to 4 to the light guiding plate light source 380. A lighting body is omitted in the embodiment shown in FIG. 17. When the planar light source device 380 is employed, since virtual images 368V of a reflection pattern 386R output from the sheet 100 continuously overlap, the reflection pattern 386R may be concealed and a uniform brightness may be realized.

Now, a micro-lens type rear side image concealing sheet in accordance with embodiments of the present invention is set forth. A planar light source device using the same will be described hereinafter.

Figure 18:
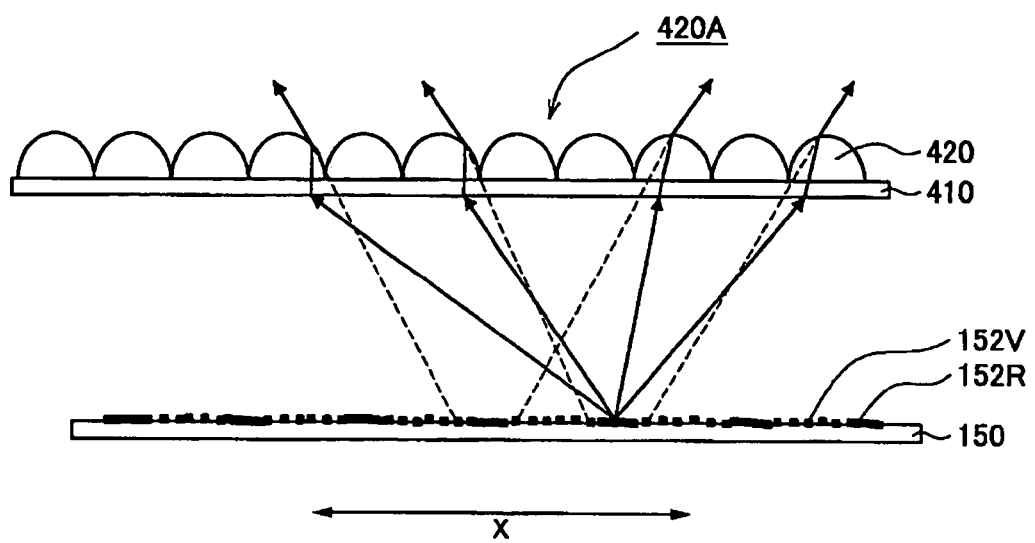
FIG. 18 illustrates a cross-sectional view of a concealing sheet in accordance with a fifth embodiment of the present invention.

In FIG. 18, a concealing sheet 400 according to a fifth embodiment of the present invention may include a light transmission plate 410 and a micro-lens array 420A on the light transmission plate 410. The micro-lens array 420A may include a plurality of micro-lenses 420. The concealing sheet 400 may overlap a real image 152R on the medium 150 disposed below a rear side of the sheet with a virtual image 152V of the real image 152R when viewing the sheet above the surface thereof, so that the real image 152R may be optically concealed on the surface of the sheet.

The light transmission plate 410 and the micro-lenses 420 may be formed of the transparent resins and variations thereon enumerated above with regard to the light transmission plate 110 and the prisms 120. The light transmission plate 410 may include light-scattering particles distributed throughout.

Each of the micro-lenses 420 may have a diameter of, e.g., 20~200 μm, which is less than or equal to the resolution limit of the naked eye, and may have a radius of curvature adjusted such that virtual images 152V formed by refraction at a tangential line on the micro-lens overlap each other at equal intervals without a gap between real images 152R.

Figure 19:
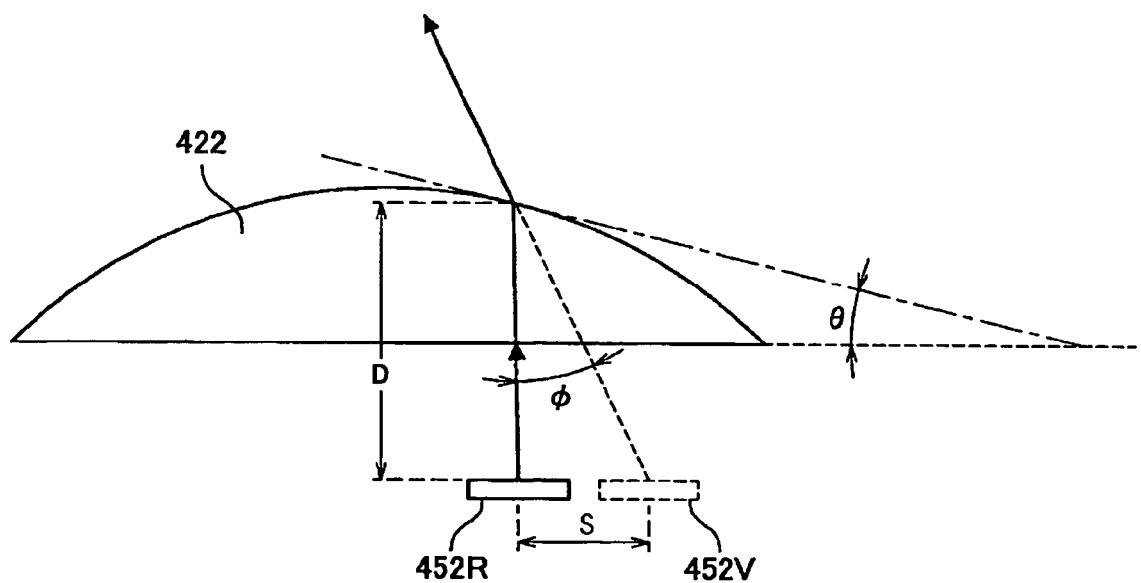
FIG. 19 illustrates an explanatory drawing showing a principle of concealing a rear side image by the concealing sheet in accordance with the fifth embodiment of the present invention.
Figure 20:
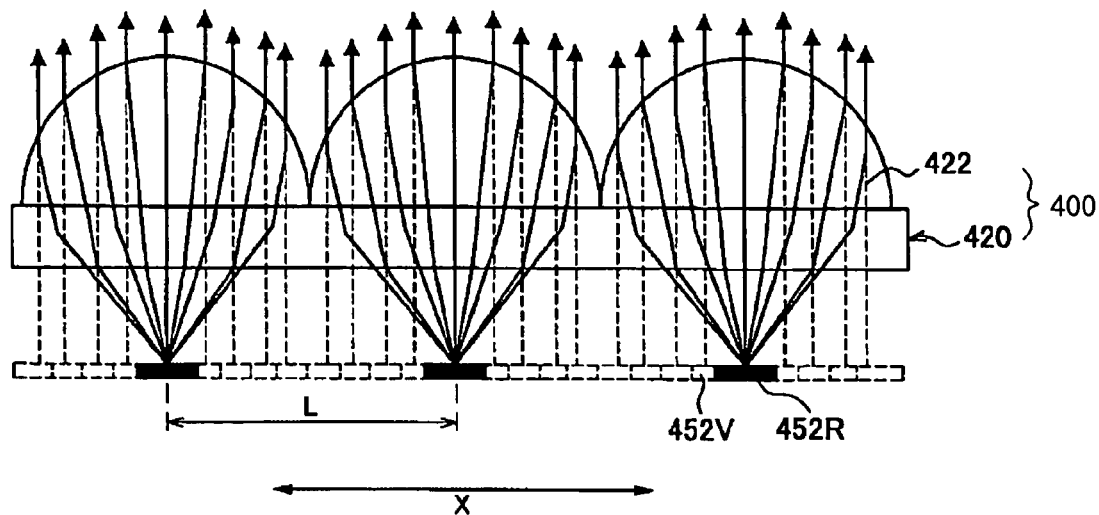
FIG. 20 illustrates an explanatory drawing showing a principle of concealing the rear side image by the concealing sheet in accordance with the fifth embodiment of the present invention.

In FIGS. 19 and 20, a principle of the rear side image concealing sheet 400 is illustrated. As shown in FIG. 19, when a tangential line on a curved surface of the micro-lens is θ and the point is separated a distance D from a real image 452R, a location X of a virtual image 452V formed by the micro-lens can be obtained by the following Equation 2:

$$S = D \cdot \tan \phi \qquad (2)$$

where, $\phi = \sin^{-1}(n \cdot \sin \theta) - \theta$, and n is a refractive index of the micro-lens material.

Accordingly, as shown in FIG. 20, using micro-lenses having a radius of curvature with an appropriate angle θ allows a plurality of virtual images 452V to be arranged at an equal interval without a gap within a distance L between adjacent real images 452R. As can be seen, Equation 2 is the same as Equation 1. Since the surface of the micro-lens is continuous, each micro-lens effectively has an infinite number of refractive surfaces at the angle θ. Thus, the relationship noted above between the number of refractive surfaces required in the prism by a particular array of light sources will always be met by the micro-lenses.

Next, referring to FIG. 21, a planar light source device 500 including the concealing sheet 400 as described above will be described.

Figure 21:
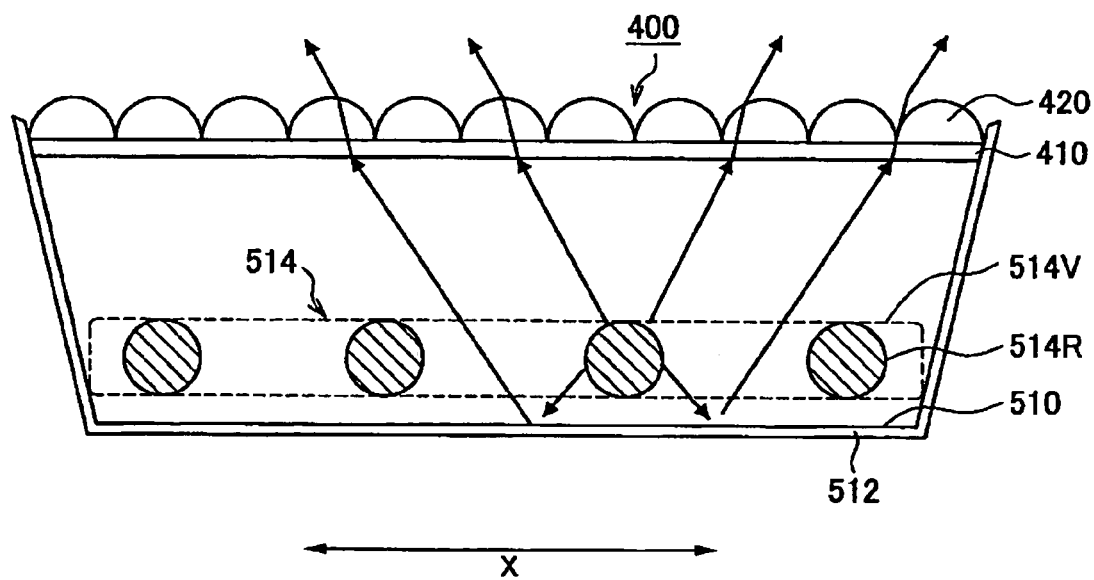
FIG. 21 illustrates a cross-sectional view of a planar light source device having the concealing sheet in accordance with the fifth embodiment of the present invention and a rod-shaped light source.

As shown in FIG. 21, the planar light source device 500 may include a lighting body 512 having a mirror reflection plane or a diffusion reflection plane 510 formed on an inner bottom surface thereof, and an opening formed at an upper portion thereof. The lighting body 512 may house a plurality of rod-shaped light sources 514, e.g., CCFLs, arranged substantially in parallel to each other at a lower portion thereof to form a rod-shaped light source array. Although four rod-shaped light source rows are shown in the example of FIG. 21, this structure is adopted for convenience of description. Thus, it should be noted that the dimensions, the number of the rod-shaped light sources 514, and an arranging distance therebetween can be suitably selected according to the size or the brightness of the planar light source device required for the design.

The opening of the lighting body 512 may be closed by the concealing sheet 400. The radius of curvature of each micro-lens in the concealing sheet 400 may be adjusted to allow a plurality of virtual images 514V formed by a tangential line on the micro-lens to be arranged at an equal interval without a gap within a distance L between adjacent real images 514R of the rod-shaped light source.

Figure 22:
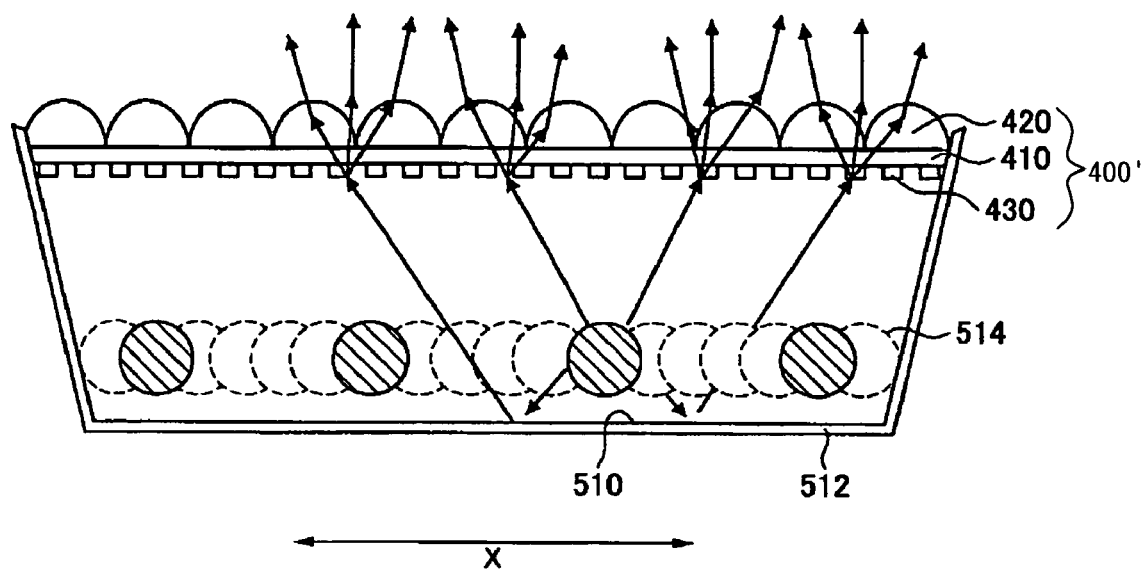
FIG. 22 illustrates a cross-sectional view of a planar light source device having a concealing sheet in accordance with a sixth embodiment of the present invention and a rod-shaped light source.

As shown in FIG. 22, a planar light source device 520 may include the lighting body 512, the plurality of rod-shaped light sources 514 and a concealing sheet 400' in accordance with a sixth embodiment of the present invention. The concealing sheet 400' may include the light transmission plate 410, the micro-lenses 420 and at least one layer of a surface relief type and/or volume phase type grating 430 on a rear side of the light transmission plate. With this structure, diffracted images of light sources may be generated in specific plural directions according to pitches of the grating, thereby providing a planar light source having a more uniform distribution in brightness while further enhancing effect of concealing the patterned light sources.

Figure 23:
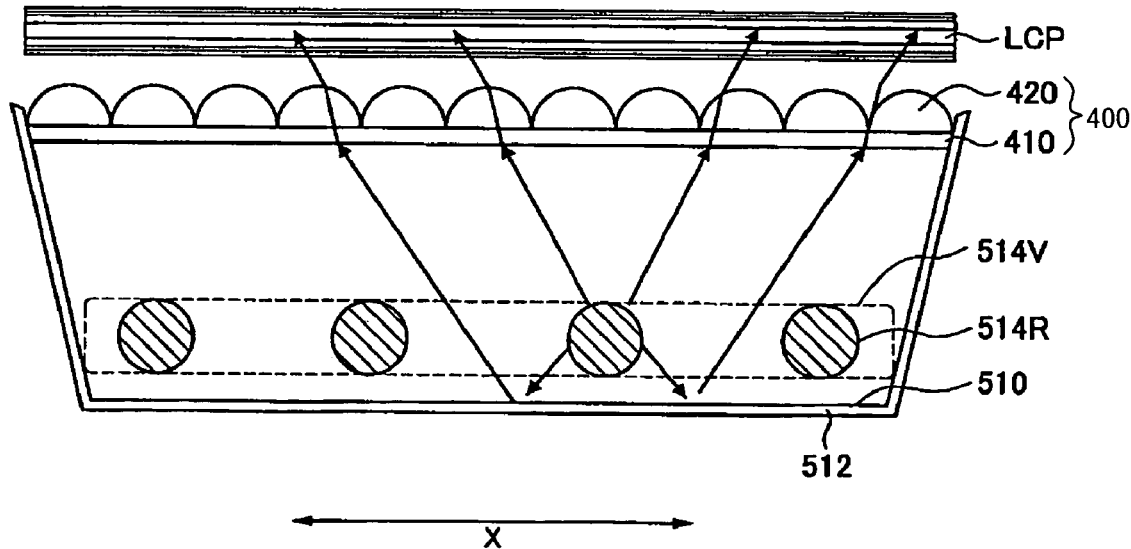
FIG. 23 illustrates a cross-sectional view of a liquid crystal display including the planar light source device having the micro-lens rear side image concealing sheet in accordance with the fifth embodiment of the present invention and a rod-shaped light source.

In FIG. 23, a LCD 600 may include the planar light source device 500 and an LCP. An LCP driving device (not shown) forms an image on the LCP. In the LCD 600, a rear side of the LCP is illuminated with light having high in-plane uniform brightness without mura, and the illuminated image is emitted from a surface of the LCP. Since the LCP and the LCP driving device are not directly related to the present invention, detailed description thereof will be omitted hereinafter.

Figure 24:
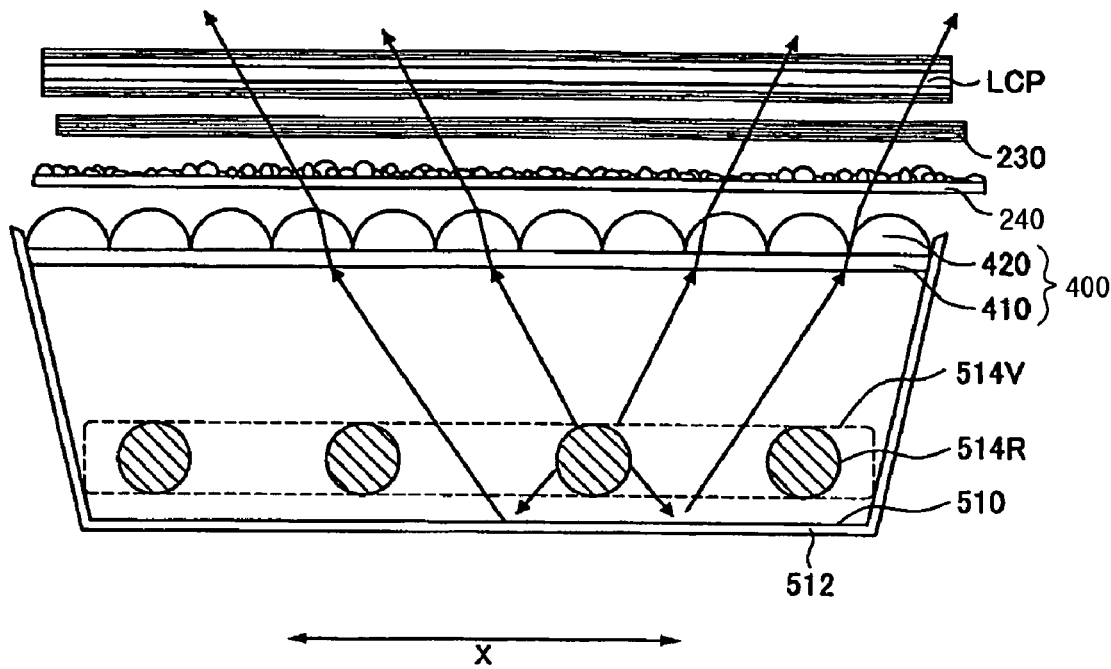
FIG. 24 illustrates a cross-sectional schematic view of a liquid crystal display including the planar light source device having the concealing sheet in accordance with the fifth embodiment of the present invention, a rod-shaped light source and an additional diffuser.

In FIG. 24, a LCD 610 may include the planar light source device 500 and the diffusion sheet 240 and the brightness increasing film 230 between the planar light source device 500 and the LCP. The variations concerning these additional elements described above with reference to FIG. 10 are also applicable.

Figure 25:
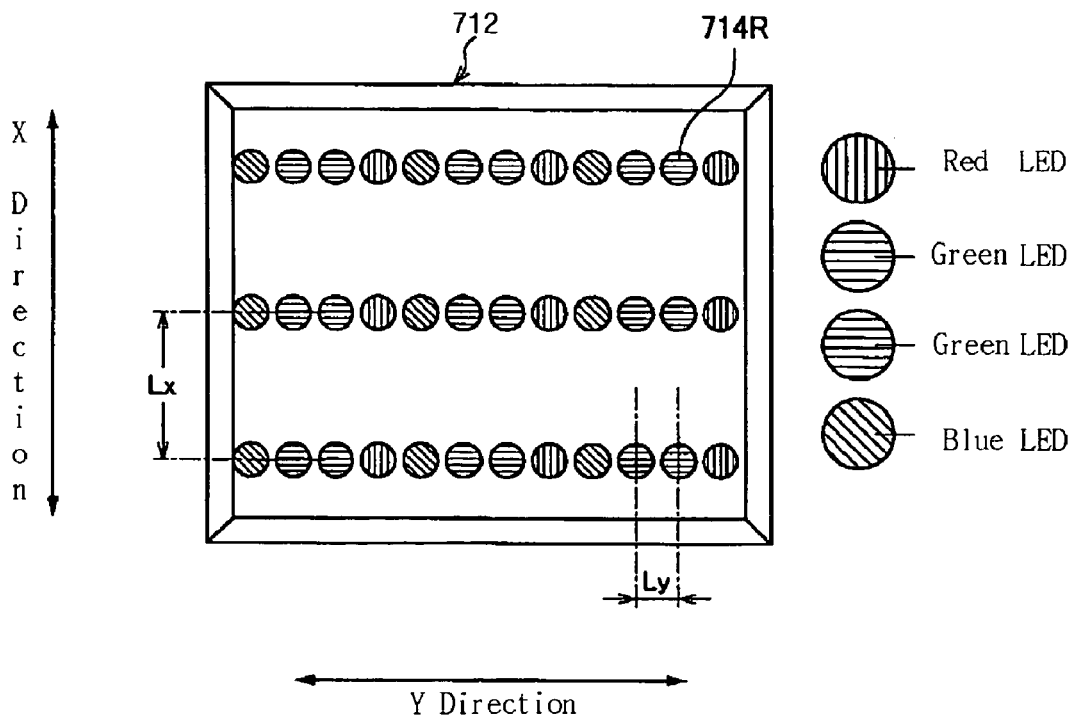
FIG. 25 illustrates a plan view of a planar light source device having an LED light source array.
Figure 26:
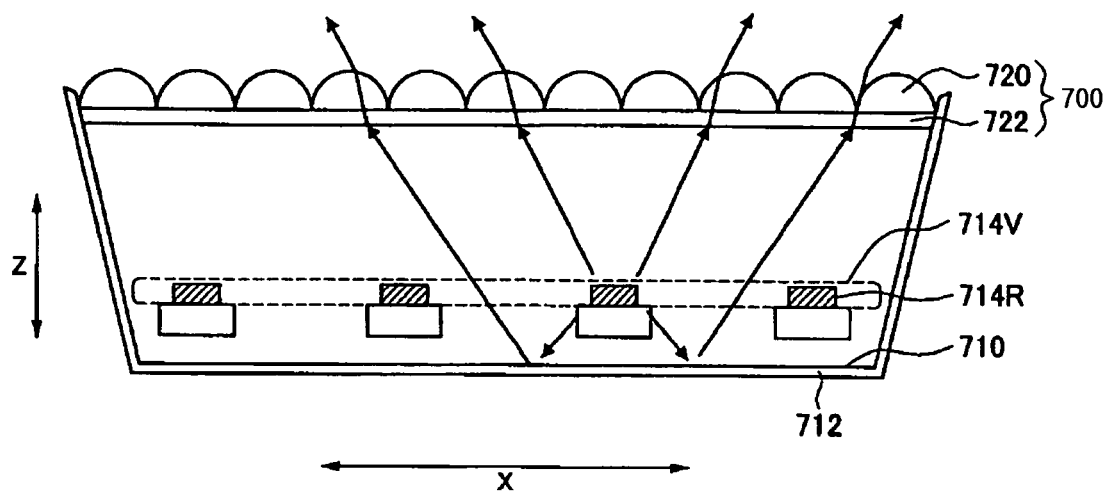
FIG. 26 illustrates a cross-sectional view taken along XZ axes of a planar light source device having a micro-lens rear side image concealing sheet in accordance with a seventh embodiment of the present invention and the LED light source array of FIG. 25.
Figure 27:
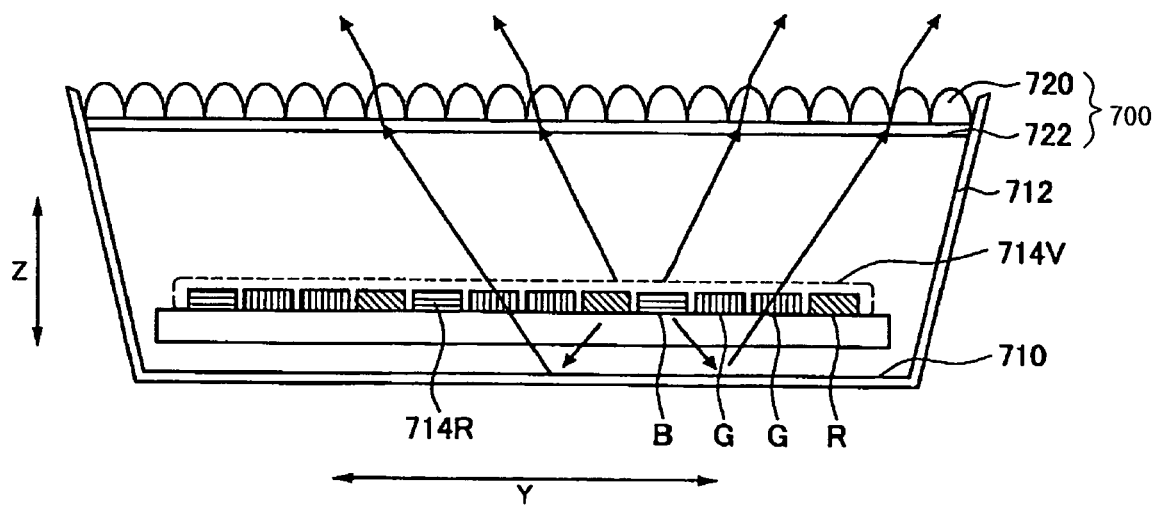
FIG. 27 illustrates a cross-sectional view taken along YZ axes of the planar light source device in FIG. 26.

Next, referring to FIGS. 25 to 27, a planar light source device 730 may include LED light sources 714R which are linearly arranged and include LED light sources for RGB colors and a concealing sheet 700 in accordance with a seventh embodiment of the present invention. As shown in FIGS. 26 and 27, the planar light source device 730 may have a lighting body 712 with a mirror reflection plane or a diffusing reflection plane 710 formed on an inner bottom surface thereof, and has an opening formed at an upper portion thereof. As shown in FIG. 25, the lighting body 712 may house a plurality of LED light source sets arranged in plural rows in an X direction to constitute patterned light sources, in which each LED light source set comprises one red LED, two green LEDs, and one blue LED linearly arranged. Here, a distance between the LED light sources 714R adjacent to each other in the X direction is Lx, and a distance between the LED light sources 714R adjacent to each other in a Y direction is Ly.

Figure 28:
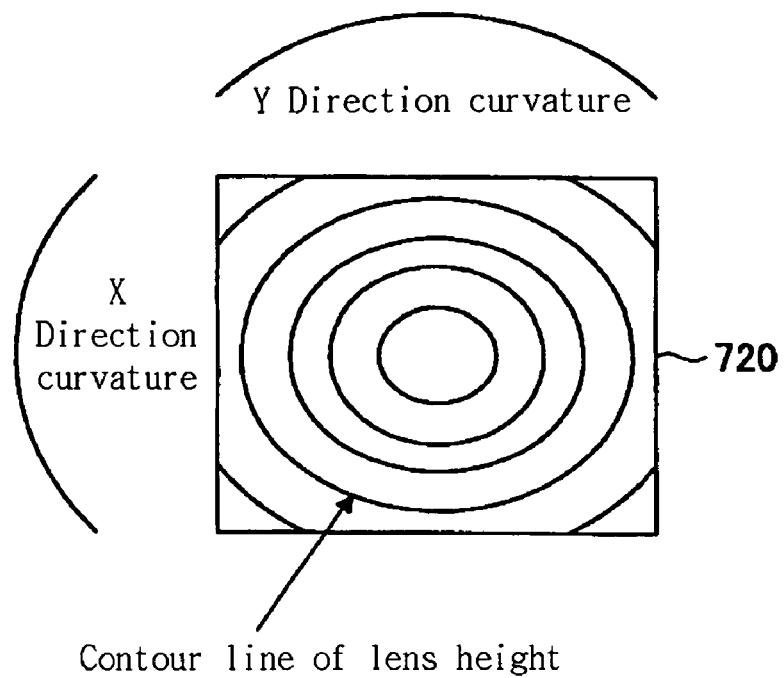
FIG. 28 illustrates an explanatory drawing of the structure of an anamorphic micro-lens used in the concealing sheet in accordance with the seventh embodiment of the present invention.
Figure 29:
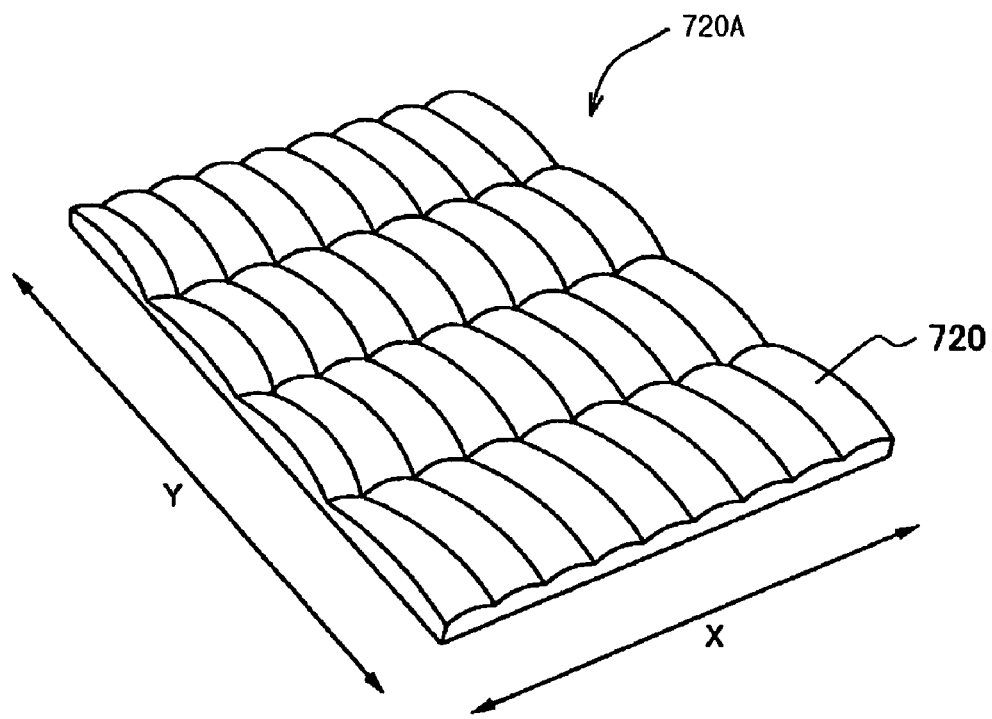
FIG. 29 illustrates a perspective view of an anamorphic micro-lens array to be used as the concealing sheet in accordance with the seventh embodiment of the present invention.

In order to obtain illumination light having high in-plane uniformity of brightness from the LED light sources arranged as described above, the concealing sheet 700 may include a light transmission plate 722 and anamorphic micro-lenses 720, as shown in FIG. 28. The anamorphic micro-lenses 720 have different radii of curvature along mutually perpendicular axes. The anamorphic micro-lenses create virtual images of the linear LED light sources 714R continuously along the distance Lx of the X direction, and create virtual images continuously along the distance Ly of the Y direction. By arranging the plurality of anamorphic micro-lenses 720 having the property as described above on a light transmission plate 722, an anamorphic micro-lens array 720A as shown in FIG. 29 may be formed.

FIG. 26 illustrates a cross-sectional view taken along XZ axes of the planar light source device 730 according to this embodiment, and FIG. 27 illustrates a cross-sectional view taken along YZ axes of the planar light source device 730. As shown in FIGS. 26 and 27, virtual images 714V of the linear LED light source-rows 714R may be formed in the X direction, and virtual images 714V of the LED light sources may be formed in the Y direction, in which red, blue and green colors are mixed.

Figure 30:
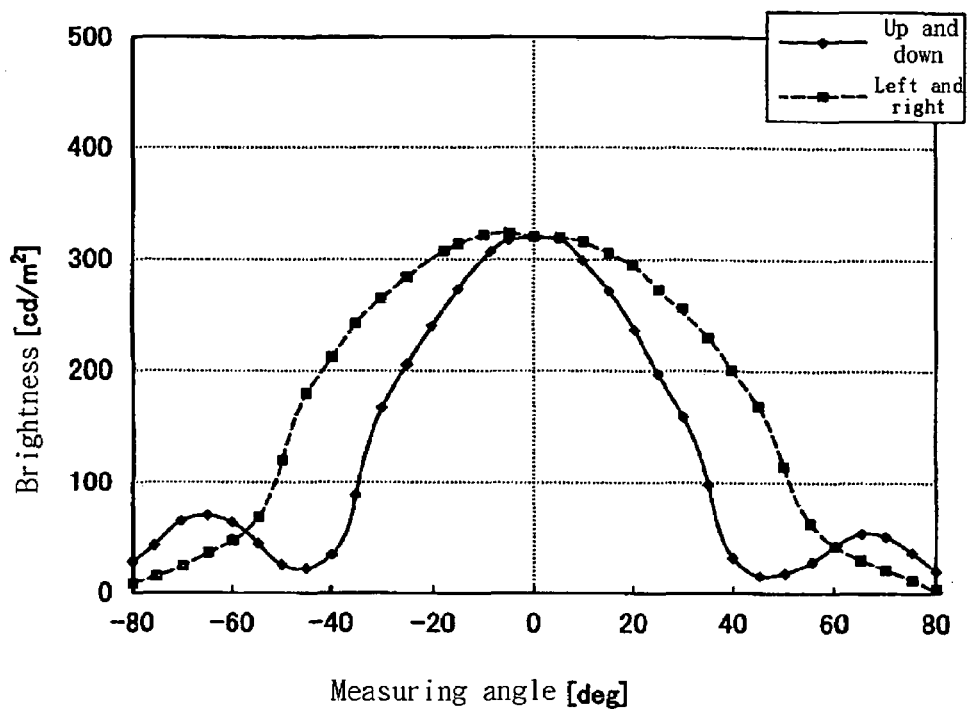
FIG. 30 illustrates a plot of brightness versus measuring angle of a related art planar planar light source device.
Figure 31:
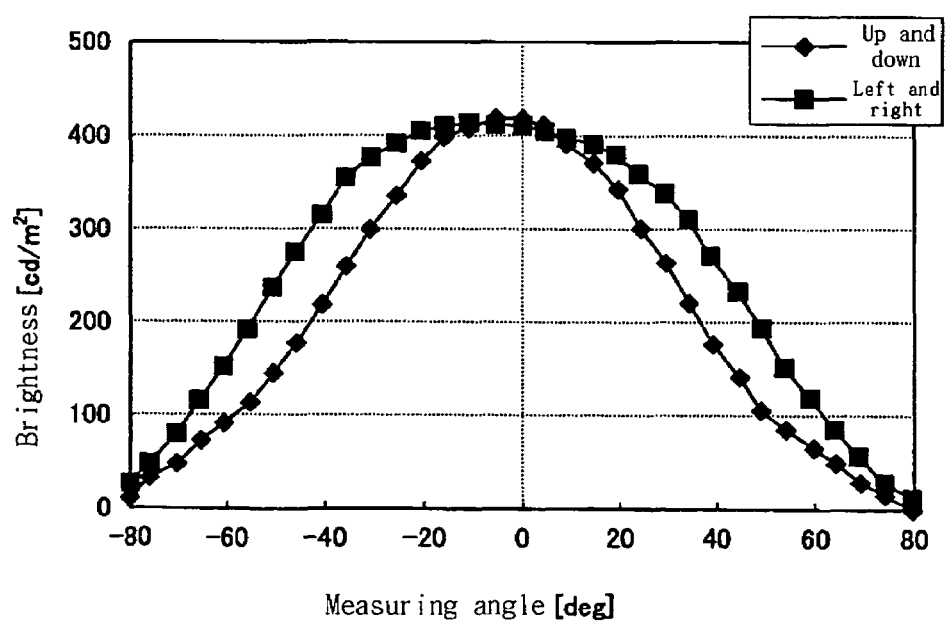
FIG. 31 illustrates a plot of brightness versus measuring angle of a planar light source device in accordance with the seventh embodiment of the present invention.

FIG. 30 illustrates a plot of brightness versus measuring angle of a related art planar light source device, and FIG. 31 illustrates a plot of brightness versus measuring angle of the planar light source device 730 using the concealing sheet 700 in accordance with the seventh embodiment. As can be appreciated from comparison of FIGS. 30 and 31, at a measuring angle of 0°, the related art planar light source device emits light having a brightness of about 300 cd/m$^2$, whereas the planar light source device 730 emits light having a brightness of about 400 cd/m$^2$. As such, it is possible to obtain plane-illumination light having high in-plane uniformity of the brightness without generating mura with the structure as described above.

Figure 32:
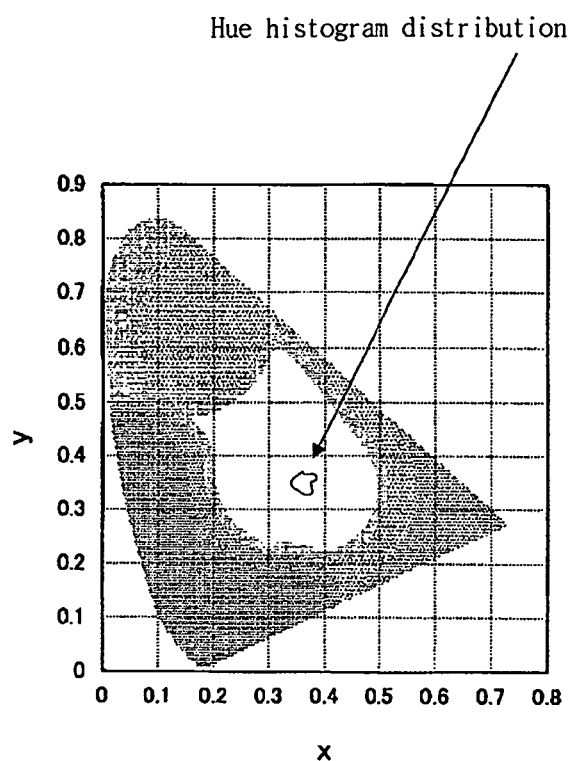
FIG. 32 illustrates a hue histogram distribution of the related art planar light source device.
Figure 33:
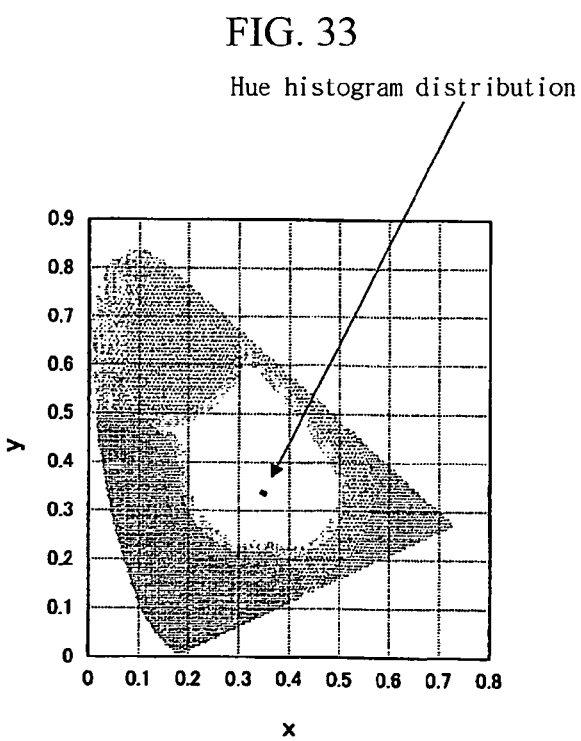
FIG. 33 illustrates a hue histogram distribution of the planar light source device in accordance with the seventh embodiment of the present invention.
Figure 34:
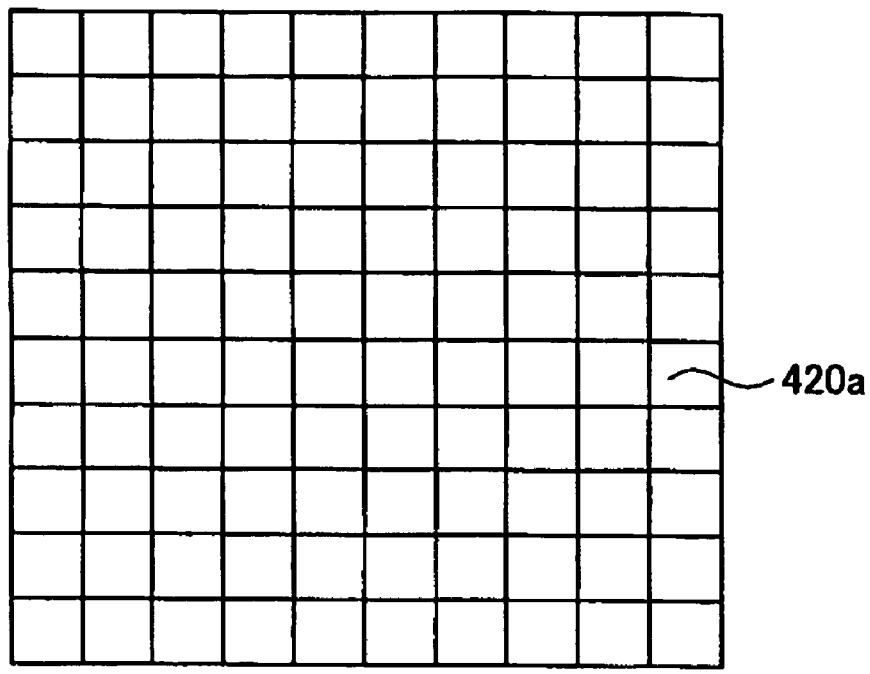
FIG. 34 illustrates a plan view of a first example of a micro-lens array.
Figure 35:
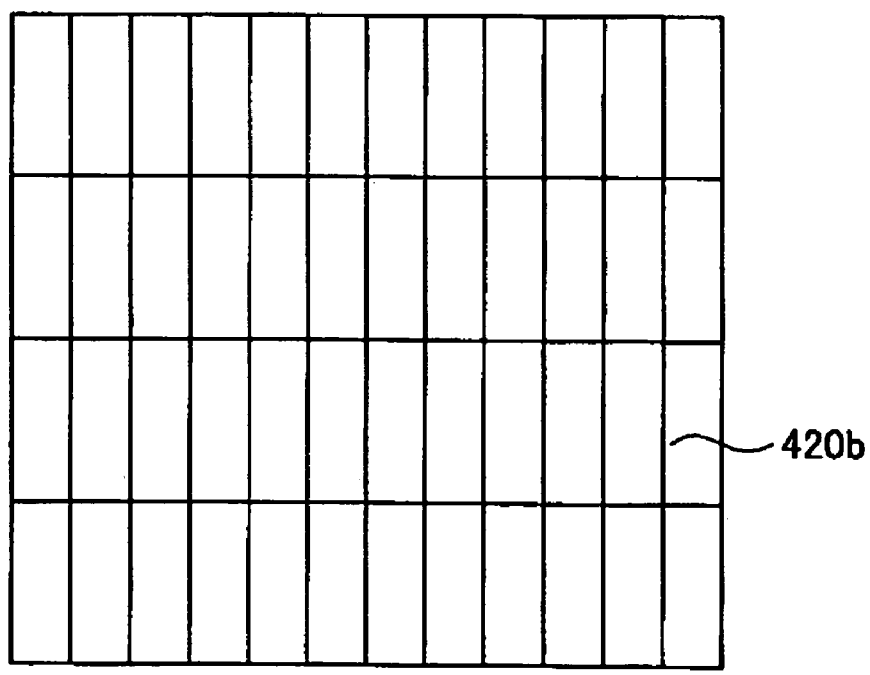
FIG. 35 illustrates a plan view of a second example of a micro-lens array.

FIG. 32 illustrates a hue histogram distribution obtained from plural elements of the related art planar light source device, and FIG. 33 illustrates a hue histogram distribution obtained from the planar light source device 730. As can be appreciated from these histograms, the planar light source device 730 provides more uniform white color which does not exhibit difference in hue histogram distribution depending on locations as compared to the related art planar light source device.

Figure 36:
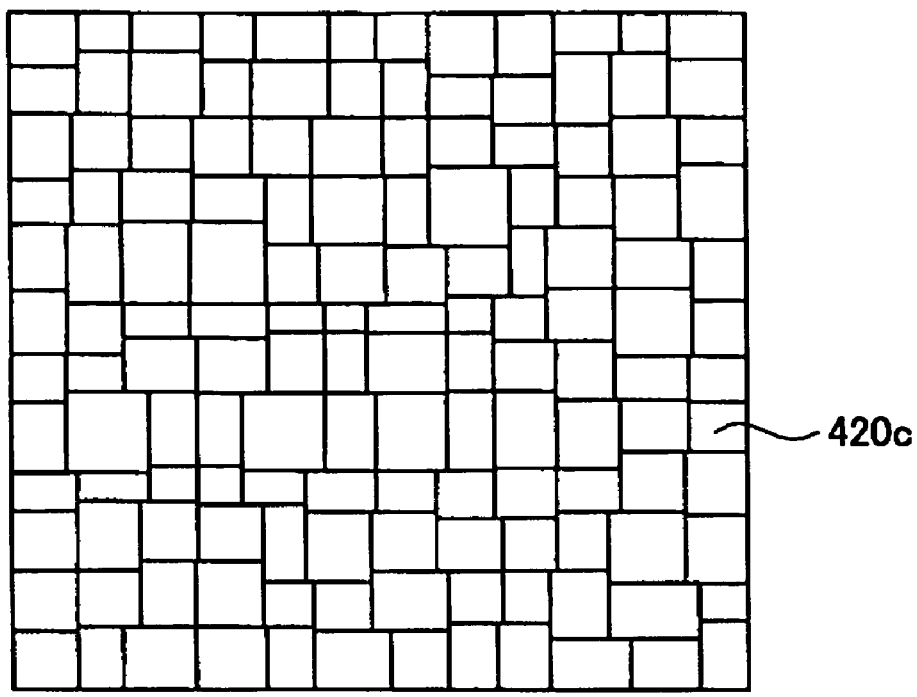
FIG. 36 illustrates a plan view of a third example of a micro-lens array.
Figure 37:
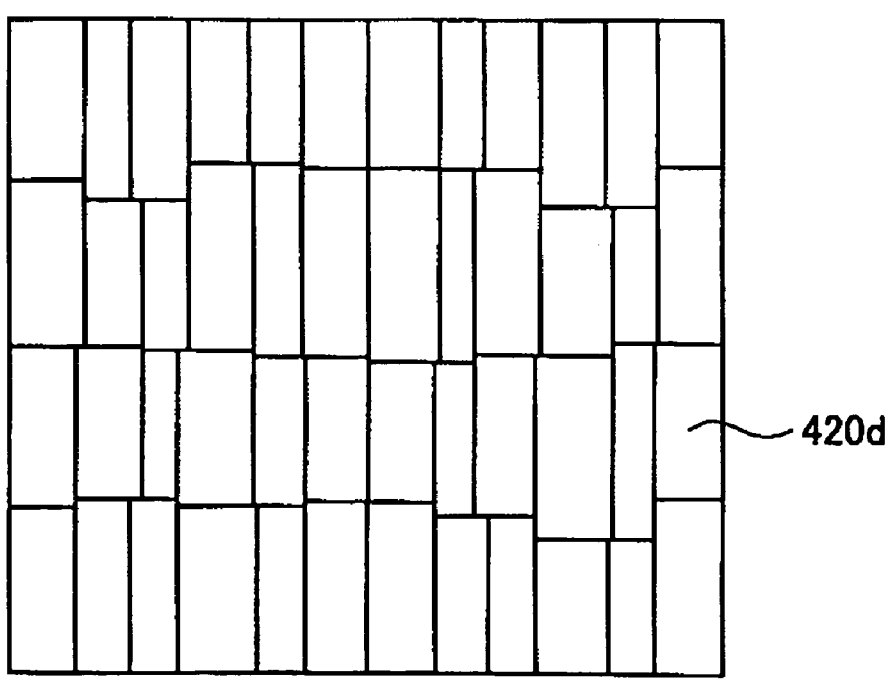
FIG. 37 illustrates a plan view of a fourth example of a micro-lens array.

FIGS. 34 to 37 illustrate plan views of various examples of arrangements of micro-lenses, respectively. In a micro-lens array 420a shown in FIG. 34, micro-lenses may be uniform, uniformly arranged and each have an equal length and width. In a micro-lens array 420b shown in FIG. 35, micro-lenses may be uniform, uniformly arranged and each have a different length and width. FIGS. 36 and 37 illustrate random arrangements of micro-lenses. In a micro-lens array 420c shown in FIG. 36, micro-lenses may have random sizes with some range, e.g., between about 25~100 μm both in the X direction and the Y direction. In a micro-lens array 420d shown in FIG. 37, micro-lenses may have random sizes in different ranges, e.g., between about 25~100 μm in the X direction, and between about 80~120 μm in the Y direction.

As described above, the micro-lenses 420 may be arranged in various manners, so that moiré between pixels may be minimized or avoided, thereby providing illumination light which can realize image display having high in-plane uniformity in brightness without generating mura.

Figure 38:
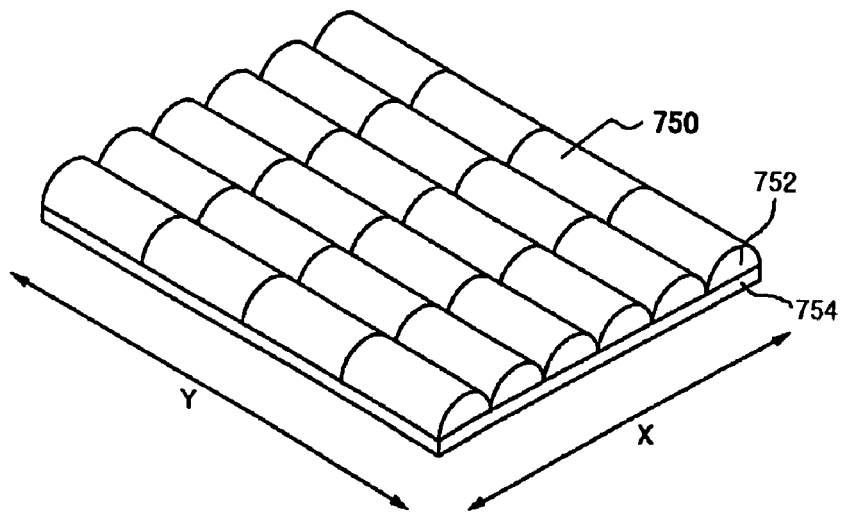
FIG. 38 illustrates a perspective view of a concealing sheet in accordance with an eight embodiment of the present invention.

FIG. 38 illustrates a concealing sheet 750 in accordance with an eighth embodiment of the present invention. The concealing sheet 750 may include a light transmission plate 754 and a micro-cylindrical lens array 752, e.g., a lenticular lens sheet, which may replace the micro-lens array 420. With the micro-cylindrical lens array 752 shown in FIG. 38, the planar light source device can have the same effects as that of the above planar light source devices. That is, it is possible to obtain plane-illumination light having high in-plane uniformity of the brightness without generating mura by concealing the rear-side patterns.

Figure 39:
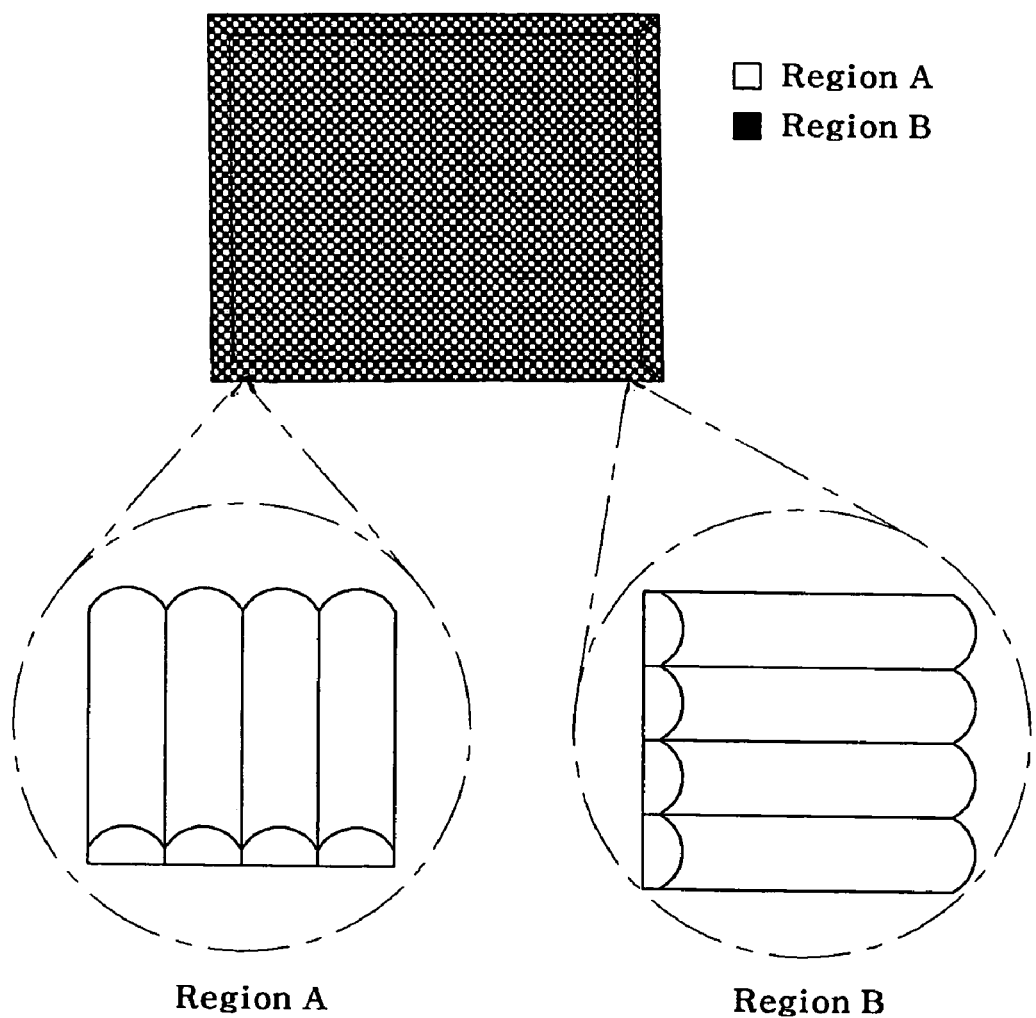
FIG. 39 illustrates a perspective view of a concealing sheet in accordance with a ninth embodiment of the present invention.

In FIG. 39, a concealing sheet 800 in accordance with a ninth embodiment of the present invention may include regions A, each of which may include micro-cylindrical lenses having curves looking like virtual images of point sources, e.g., LED light sources, continuously arranged at a tight interval in a distance Lx of the X direction, and regions B, each of which may include micro-cylindrical lenses having curves looking like the virtual images of the LED light sources infinitely arranged at a tight interval in a distance Ly of the Y direction. The regions A and B may be arranged in a checkerboard pattern. With this structure, plane-illumination light having improved in-plane uniformity of the brightness without generating mura may be realized.

Figure 40:
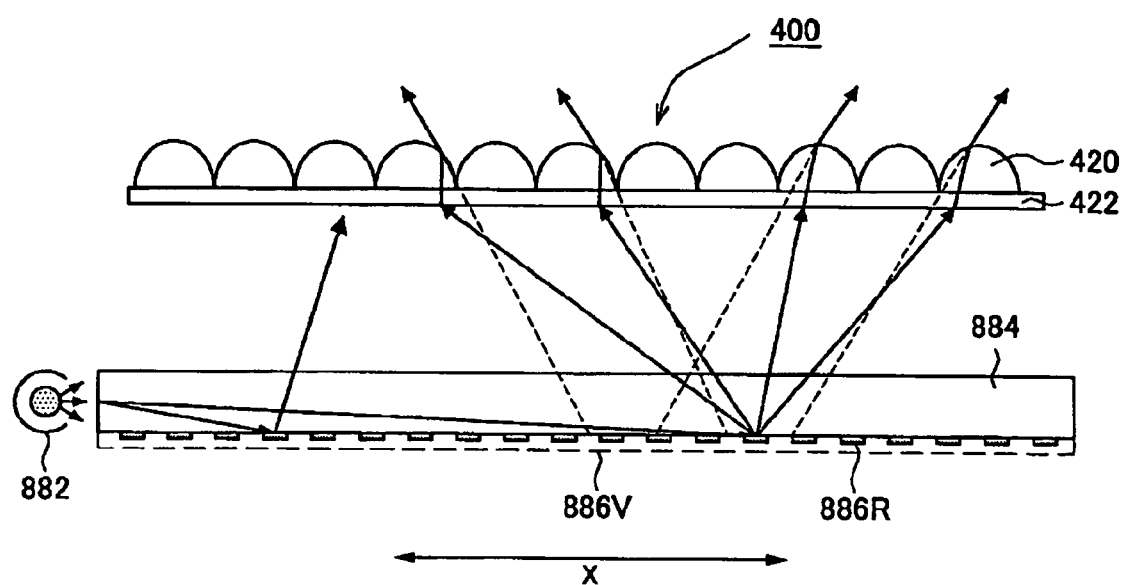
FIG. 40 illustrates a cross-sectional view of a planar light source device having the concealing sheet in accordance with the fifth embodiment of the present invention, a light guide plate and an edge emitting light source.

Referring to FIG. 40, a planar light source device 880 may include an edge type source and the concealing sheet 400 in accordance with the fifth embodiment. The edge type source may include an edge light source 882, e.g., CCFL, a light guide plate 884 formed of a transparent substrate material to guide light from the edge light source 882, and printed dot or line patterns 886R formed on the rear side of the light guide plate 884 to reflect the light guided in the light guide plate 384 towards the surface of the sheet 400. A lighting body for housing the light guiding plate light source 880 is not shown. With the structure as described above, the micro-lens array 420 can effectively conceal the shape of a reflection pattern array while providing uniform brightness distribution.

The present invention can be applied to the use for concealing a pattern of light sources in a planar light source, or to a display using the planar light source which does not generate MURA.

As apparent from the above description, according to the present invention, by using a polygonal prism array or a micro-lens array, a plurality of virtual images of point or line light sources arranged in a pattern appear to be output from the planar light source device as uniformly bright light, thereby concealing the pattern of the light sources. Mura may also be reduced or eliminated.

In addition, according to the invention, since the light transmission plate is transparent, the planar light source device can transmit light emitted from the light source therethrough. Furthermore, the planar light source device of the invention does not require the diffusion plate or the diffusion sheet, and may sufficiently blur the pattern of the light sources using only a weak diffusion function.

Exemplary embodiments of the present invention have been disclosed herein, and although specific terms are employed, they are used and are to be interpreted in a generic and descriptive sense only and not for purpose of limitation. Any of the variations discussed above may be used with other embodiments. Accordingly, it will be understood by those of ordinary skill in the art that various changes in form and details may be made without departing from the spirit and scope of the present invention as set forth in the following claims.

What is claimed is:

1. A planar light source device, comprising:
    an illuminator including an array of adjacent light sources;
    a light transmission plate in an optical path of light output by the illuminator; and
    a plurality of refractive diffusing elements on the light transmission plate, wherein:
    each refractive diffusing element provides more than two refractive surfaces in at least one vertical cross-section along the optical path at an angle determined in accordance with a distance between the adjacent light sources of the array of light sources, such that the angle is relative to the distance between the adjacent light sources.

2. The planar light source device as claimed in claim 1, wherein each refractive diffusing element is a polygonal prism having a polygon shape in a horizontal cross-section orthogonal to the optical path.

3. The planar light source device as claimed in claim 2, wherein surfaces of each polygonal prism in both vertical cross-sections have angles adjusted such that virtual images formed by the refractive surfaces continuously overlap each other.

4. The planar light source device as claimed in claim 2, wherein a maximum length of each refractive surface in the at least one vertical cross-section is less than or equal to a resolution limit of a naked eye.

5. A planar light source device, comprising:
an illuminator including an array of rod-shaped light sources;
a light transmission plate in an optical path of light output by the illuminator; and
a plurality of refractive diffusing elements on the light transmission plate, wherein:
each refractive diffusing element provides more than two refractive surfaces in a vertical cross-section along the optical path at an angle determined in accordance with a pattern of the array of light sources,
a longitudinal direction of the rod-shaped light sources is a first direction orthogonal to the optical path and corresponds to a longitudinal direction of the polygonal prisms, and
for a distance "a" between adjacent rod-shaped light sources in a direction of the vertical cross-section orthogonal to the optical path, a diameter "b" of each rod-shaped light source, and a number "m" of refractive surfaces of each polygonal prism in the vertical cross-section, $m \geq a/b$ and m is greater than two.

6. The planar light source device as claimed in claim 1, wherein:
the light sources are full color light emitting diode (LED) units arranged in X and Y directions to form an LED array;
the more than two refractive surfaces of each polygonal prism in a vertical cross-section in the Y direction have angles adjusted such that virtual images of LED units continuously overlap; and
the more than two refractive surfaces of each polygonal prism in the vertical cross-section in the X direction have angles adjusted such that virtual images of LED units continuously overlap.

7. The planar light source device as claimed in claim 2, wherein:
the light sources are a reflection pattern on a surface of a light guide plate; and
the refractive surfaces of each polygonal prism have angles set corresponding to the reflection pattern.

8. The planar light source device as claimed in claim 1 wherein each refractive diffusing element is a micro-lens.

9. The planar light source device as claimed in claim 8, wherein each micro-lens has a size less than or equal to a resolution limit of a naked eye.

10. The planar light source device as claimed in claim 8, wherein the light sources are rod-shaped light sources arranged in parallel.

11. The planar light source device as claimed in claim 8, wherein:
the light sources are full color light emitting diode (LED) units arranged in parallel in X and Y directions to form a LED array;
each of the micro-lenses is an anamorphic lens having different radii of curvature in the X and Y directions, respectively; and
the radii of curvature is adjusted such that virtual images of the LED light sources continuously overlap in the Y direction and virtual images of the LED light sources continuously overlap in the X direction.

12. The planar light source device as claimed in claim 8, wherein:
the light sources are a reflection pattern on a surface of a light guide plate; and
each micro-lens has a shape set corresponding to the reflection pattern.

13. The planar light source device as claimed in claim 8, wherein the micro-lens array is a micro-cylindrical lens array.

14. The planar light source device as claimed in claim 13, wherein the micro-cylindrical lens array comprises a plurality of cells corresponding to the pattern of the light source, a first cell having a plurality of the micro-cylindrical lenses arranged in a first direction, and at least one cell surrounding the first cell having a plurality of the micro-cylindrical lenses arranged in a second direction.

15. The planar light source device as claimed in claim 8, wherein sizes of the micro-lenses vary within the array.

16. The planar light source device as claimed in claim 1, further comprising at least one of surface relief type or volume phase type grating in the optical path of the illuminator.

17. A substrate for a planar light source device, the substrate comprising a plurality of polygonal prisms forming a polygonal prism array formed on at least one surface thereof, each polygonal prism having a quadrilateral shape in a horizontal cross-section and having a plurality of segments in a vertical cross section, at least four of the plurality of segments having angles of inclination with respect to a plane parallel to the horizontal cross-section, wherein the angles of inclination of the at least four of the plurality of segments are equally spaced.

18. A display, comprising:
a display panel; and
a planar light source device illuminating the display panel, the planar light source device including:
an illuminator including an array of adjacent light sources,
a light transmission plate in an optical path of light output by the illuminator, and
a plurality of refractive diffusing elements on the light transmission plate, wherein:
each refractive diffusing element provides more than two refractive surfaces in at least one vertical cross-section along the optical path at an angle determined in accordance with a distance between the adjacent light sources of the array of light sources, such that the angle is relative to the distance between the adjacent light sources.

19. A display, comprising:
a display panel; and
a planar light source device illuminating the display panel, the planar light source device having a substrate including a plurality of polygonal prisms forming a polygonal prism array formed on at least one surface thereof, each polygonal prism having a quadrilateral shape in a horizontal cross-section and having a plurality of segments in a vertical cross section, at least four of the plurality of segments having angles of inclination with respect to a plane parallel to the horizontal cross-section, wherein the angles of inclination of the at least four of the plurality of segments are equally spaced.

20. The planar light source device as claimed in claim 1, wherein the light sources are positioned directly behind the light transmission plate.

21. The planar light source device as claimed in claim 1, wherein:
first and second refractive diffusing elements, the first and second refractive diffusing elements being directly adjacent to one another, create first and second adjacent real images of the array of light sources, and
the first and second refractive diffusing elements create a plurality of virtual images between the first and second adjacent real images, each of the plurality of virtual images overlapping another of the plurality of virtual images, and each of the plurality of virtual images being equally spaced.

22. The planar light source device as claimed in claim 2, wherein a maximum length of each refractive surface in the at least one vertical cross-section is about 20 μm to about 300 μm.

23. The planar light source device as claimed in claim 1, wherein:
the refractive surfaces have angles θ relative to real images of the light sources of the array of light sources,
the adjacent light sources of the array of light sources are separated by a distance L, and
the angles θ are determined such that virtual images formed by the refractive surfaces continuously overlap each other throughout the distance L.

24. The display as claimed in claim 18, wherein:
the refractive surfaces have angles θ relative to real images of the light sources of the array of light sources,
the adjacent light sources of the array of light sources are separated by a distance L, and
the angles θ are determined such that virtual images formed by the refractive surfaces continuously overlap each other throughout the distance L.

* * * * *